United States Patent
Hasenplaugh et al.

(10) Patent No.: US 10,402,168 B2
(45) Date of Patent: Sep. 3, 2019

(54) LOW ENERGY CONSUMPTION MANTISSA MULTIPLICATION FOR FLOATING POINT MULTIPLY-ADD OPERATIONS

(71) Applicant: Intel Corporation, Santa Clara, CA (US)

(72) Inventors: William C. Hasenplaugh, Boston, MA (US); Kermin E. Fleming, Jr., Hudson, MA (US); Tryggve Fossum, Northborough, MA (US); Simon C. Steely, Jr., Hudson, NH (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 15/283,295

(22) Filed: Oct. 1, 2016

(65) Prior Publication Data

US 2018/0095728 A1    Apr. 5, 2018

(51) Int. Cl.
 *G06F 7/487* (2006.01)
 *G06F 7/544* (2006.01)

(52) U.S. Cl.
 CPC .......... *G06F 7/5443* (2013.01); *G06F 7/4876* (2013.01)

(58) Field of Classification Search
 None
 See application file for complete search history.

(56) References Cited

U.S. PATENT DOCUMENTS 5,560,032 A    9/1996 Nguyen et al.
5,574,944 A    11/1996 Stager
(Continued)

FOREIGN PATENT DOCUMENTS

EP    2660716 A1    11/2013
EP    2854026 A1    4/2015
(Continued)

OTHER PUBLICATIONS

International Search Report and Written Opinion received for PCT Patent Application No. PCT/US2017/050663, dated Dec. 28, 2017, 14 pages.
(Continued)

*Primary Examiner* — Michael D. Yaary
(74) *Attorney, Agent, or Firm* — Nicholason De Vos Webster & Elliott LLP

(57) ABSTRACT

A floating point multiply-add unit having inputs coupled to receive a floating point multiplier data element, a floating point multiplicand data element, and a floating point addend data element. The multiply-add unit including a mantissa multiplier to multiply a mantissa of the multiplier data element and a mantissa of the multiplicand data element to calculate a mantissa product. The mantissa multiplier including a most significant bit portion to calculate most significant bits of the mantissa product, and a least significant bit portion to calculate least significant bits of the mantissa product. The mantissa multiplier has a plurality of different possible sizes of the least significant bit portion. Energy consumption reduction logic to selectively reduce energy consumption of the least significant bit portion, but not the most significant bit portion, to cause the least significant bit portion to not calculate the least significant bits of the mantissa product.

24 Claims, 15 Drawing Sheets

(56) References Cited

U.S. PATENT DOCUMENTS

| | | | |
|---|---|---|---|
| 5,787,029 A * | 7/1998 | de Angel | G06F 7/5338 708/625 |
| 5,805,827 A | 9/1998 | Chau et al. | |
| 5,930,484 A | 7/1999 | Tran et al. | |
| 6,020,139 A | 2/2000 | Schwartz et al. | |
| 6,088,780 A | 7/2000 | Yamada et al. | |
| 6,141,747 A | 10/2000 | Witt | |
| 6,205,533 B1 | 3/2001 | Margolus et al. | |
| 6,314,503 B1 | 11/2001 | D'Errico et al. | |
| 6,393,454 B1 * | 5/2002 | Chu | G06F 7/5338 708/630 |
| 6,393,536 B1 | 5/2002 | Hughes et al. | |
| 6,604,120 B1 * | 8/2003 | De Angel | G06F 7/503 708/628 |
| 6,721,774 B1 * | 4/2004 | Lee | G06F 7/5338 708/629 |
| 6,725,364 B1 | 4/2004 | Crabill | |
| 7,000,072 B1 | 2/2006 | Aisaka et al. | |
| 7,181,578 B1 | 2/2007 | Guha et al. | |
| 7,257,665 B2 | 8/2007 | Niell et al. | |
| 7,486,678 B1 | 2/2009 | Devanagondi et al. | |
| 7,546,331 B2 * | 6/2009 | Islam | G06F 7/5312 708/627 |
| 7,660,911 B2 | 2/2010 | McDaniel | |
| 7,987,479 B1 | 7/2011 | Day | |
| 8,010,766 B2 | 8/2011 | Bhattacharjee et al. | |
| 8,055,880 B2 | 11/2011 | Fujisawa et al. | |
| 8,156,284 B2 | 4/2012 | Vorbach et al. | |
| 8,160,975 B2 | 4/2012 | Tang et al. | |
| 8,225,073 B2 | 7/2012 | Master et al. | |
| 8,495,341 B2 | 7/2013 | Busaba et al. | |
| 8,812,820 B2 | 8/2014 | Vorbach et al. | |
| 8,990,452 B2 | 3/2015 | Branson et al. | |
| 9,026,769 B1 | 5/2015 | Jamil et al. | |
| 9,104,474 B2 | 8/2015 | Kaul et al. | |
| 9,135,057 B2 | 9/2015 | Branson et al. | |
| 9,170,846 B2 | 10/2015 | Delling et al. | |
| 9,213,571 B2 | 12/2015 | Ristovski et al. | |
| 9,268,528 B2 * | 2/2016 | Tannenbaum | G06F 7/483 |
| 9,473,144 B1 | 10/2016 | Thiagarajan et al. | |
| 9,658,676 B1 | 5/2017 | Witek et al. | |
| 9,847,783 B1 | 12/2017 | Teh et al. | |
| 2002/0090751 A1 * | 7/2002 | Grigg | H01L 23/4951 438/106 |
| 2002/0178285 A1 | 11/2002 | Donaldson et al. | |
| 2002/0184291 A1 | 12/2002 | Hogenauer | |
| 2003/0023830 A1 | 1/2003 | Hogenauer | |
| 2003/0028750 A1 | 2/2003 | Hogenauer | |
| 2003/0163649 A1 | 8/2003 | Kapur et al. | |
| 2003/0177320 A1 | 9/2003 | Sah et al. | |
| 2003/0225814 A1 | 12/2003 | Saito et al. | |
| 2003/0233643 A1 | 12/2003 | Thompson et al. | |
| 2004/0001458 A1 | 1/2004 | Dorenbosch et al. | |
| 2004/0022094 A1 | 2/2004 | Radhakrishnan et al. | |
| 2004/0022107 A1 | 2/2004 | Zaidi et al. | |
| 2004/0124877 A1 | 7/2004 | Parkes | |
| 2004/0263524 A1 | 12/2004 | Lippincott | |
| 2005/0025120 A1 | 2/2005 | O'Toole et al. | |
| 2005/0076187 A1 | 4/2005 | Claydon | |
| 2005/0108776 A1 | 5/2005 | Carver et al. | |
| 2005/0134308 A1 | 6/2005 | Okada et al. | |
| 2005/0138323 A1 | 6/2005 | Snyder | |
| 2005/0172103 A1 | 8/2005 | Inuo et al. | |
| 2006/0041872 A1 | 2/2006 | Poznanovic et al. | |
| 2006/0130030 A1 | 6/2006 | Kwiat et al. | |
| 2006/0179255 A1 | 8/2006 | Yamazaki | |
| 2007/0011436 A1 | 1/2007 | Bittner, Jr. et al. | |
| 2007/0118332 A1 | 5/2007 | Meyers et al. | |
| 2007/0143546 A1 | 6/2007 | Narad | |
| 2007/0180315 A1 | 8/2007 | Aizawa et al. | |
| 2007/0203967 A1 | 8/2007 | Dockser | |
| 2007/0276976 A1 | 11/2007 | Gower et al. | |
| 2008/0082794 A1 | 4/2008 | Yu et al. | |
| 2008/0133889 A1 | 6/2008 | Glew | |
| 2008/0133895 A1 | 6/2008 | Sivtsov et al. | |
| 2008/0184255 A1 | 7/2008 | Watanabe et al. | |
| 2008/0218203 A1 | 9/2008 | Arriens et al. | |
| 2008/0263330 A1 | 10/2008 | May et al. | |
| 2008/0270689 A1 | 10/2008 | Gotoh | |
| 2008/0307258 A1 | 12/2008 | Challenger et al. | |
| 2009/0063665 A1 | 3/2009 | Bagepalli et al. | |
| 2009/0119456 A1 | 5/2009 | Park, II et al. | |
| 2009/0300324 A1 | 12/2009 | Inuo | |
| 2009/0300325 A1 | 12/2009 | Paver et al. | |
| 2009/0309884 A1 | 12/2009 | Lippincott et al. | |
| 2009/0328048 A1 | 12/2009 | Khan et al. | |
| 2010/0017761 A1 | 1/2010 | Higuchi et al. | |
| 2010/0180105 A1 | 7/2010 | Asnaashari | |
| 2010/0217915 A1 | 8/2010 | O'Connor et al. | |
| 2010/0228885 A1 | 9/2010 | McDaniel et al. | |
| 2010/0262721 A1 | 10/2010 | Asnaashari et al. | |
| 2010/0302946 A1 | 12/2010 | Yang et al. | |
| 2011/0004742 A1 | 1/2011 | Hassan | |
| 2011/0008300 A1 | 1/2011 | Wouters et al. | |
| 2011/0083000 A1 | 4/2011 | Rhoades et al. | |
| 2011/0099295 A1 | 4/2011 | Wegener | |
| 2011/0107337 A1 | 5/2011 | Cambonie et al. | |
| 2011/0202747 A1 | 8/2011 | Busaba et al. | |
| 2011/0302358 A1 | 12/2011 | Yu et al. | |
| 2011/0314238 A1 | 12/2011 | Finkler et al. | |
| 2011/0320724 A1 | 12/2011 | Mejdrich et al. | |
| 2012/0017066 A1 | 1/2012 | Vorbach et al. | |
| 2012/0066483 A1 | 3/2012 | Boury et al. | |
| 2012/0079168 A1 | 3/2012 | Chou et al. | |
| 2012/0124117 A1 | 5/2012 | Yu et al. | |
| 2012/0126851 A1 | 5/2012 | Kelem et al. | |
| 2012/0174118 A1 | 7/2012 | Watanabe et al. | |
| 2012/0239853 A1 | 9/2012 | Moshayedi | |
| 2012/0260239 A1 | 10/2012 | Martinez et al. | |
| 2012/0278543 A1 | 11/2012 | Yu et al. | |
| 2012/0278587 A1 | 11/2012 | Caufield et al. | |
| 2012/0303932 A1 | 11/2012 | Farabet et al. | |
| 2012/0303933 A1 | 11/2012 | Manet et al. | |
| 2012/0324180 A1 | 12/2012 | Asnaashari et al. | |
| 2012/0330701 A1 | 12/2012 | Hyder et al. | |
| 2013/0036287 A1 | 2/2013 | Chu et al. | |
| 2013/0067138 A1 | 3/2013 | Schuette et al. | |
| 2013/0080652 A1 | 3/2013 | Cradick et al. | |
| 2013/0080993 A1 | 3/2013 | Stravers et al. | |
| 2013/0081042 A1 | 3/2013 | Branson et al. | |
| 2013/0145203 A1 | 6/2013 | Fawcett et al. | |
| 2013/0151919 A1 | 6/2013 | Huynh | |
| 2013/0315211 A1 | 11/2013 | Balan et al. | |
| 2014/0098890 A1 | 4/2014 | Sermadevi et al. | |
| 2014/0188968 A1 | 7/2014 | Kaul et al. | |
| 2014/0380024 A1 | 12/2014 | Spadini et al. | |
| 2015/0007182 A1 | 1/2015 | Rossbach et al. | |
| 2015/0026434 A1 | 1/2015 | Basant et al. | |
| 2015/0033001 A1 | 1/2015 | Ivanov et al. | |
| 2015/0082011 A1 | 3/2015 | Mellinger et al. | |
| 2015/0089162 A1 | 3/2015 | Ahsan et al. | |
| 2015/0089186 A1 | 3/2015 | Kim et al. | |
| 2015/0106596 A1 | 4/2015 | Vorbach et al. | |
| 2015/0261528 A1 | 9/2015 | Ho et al. | |
| 2015/0317134 A1 | 11/2015 | Kim et al. | |
| 2016/0098420 A1 | 4/2016 | Dickie et al. | |
| 2016/0239265 A1 | 8/2016 | Duong et al. | |
| 2017/0031866 A1 | 2/2017 | Nowatzki et al. | |
| 2017/0083313 A1 | 3/2017 | Sankaralingam et al. | |
| 2017/0163543 A1 | 6/2017 | Wang et al. | |
| 2017/0255414 A1 | 9/2017 | Gerhart et al. | |
| 2017/0262383 A1 | 9/2017 | Lee et al. | |
| 2017/0286169 A1 | 10/2017 | Ravindran et al. | |
| 2017/0315815 A1 | 11/2017 | Smith et al. | |
| 2017/0371836 A1 | 12/2017 | Langhammer | |
| 2018/0081834 A1 | 3/2018 | Wang et al. | |
| 2018/0088647 A1 | 3/2018 | Suryanarayanan et al. | |
| 2018/0188983 A1 | 7/2018 | Fleming, Jr. et al. | |
| 2018/0188997 A1 | 7/2018 | Fleming, Jr. et al. | |
| 2018/0189063 A1 | 7/2018 | Fleming et al. | |
| 2018/0189231 A1 | 7/2018 | Fleming, Jr. et al. | |
| 2018/0300181 A1 | 10/2018 | Hetzel et al. | |
| 2019/0004878 A1 | 1/2019 | Adler et al. | |

(56) References Cited

U.S. PATENT DOCUMENTS

| | | |
|---|---|---|
| 2019/0004945 A1 | 1/2019 | Fleming et al. |
| 2019/0004955 A1 | 1/2019 | Adler et al. |
| 2019/0004994 A1 | 1/2019 | Fleming et al. |
| 2019/0005161 A1 | 1/2019 | Fleming et al. |
| 2019/0007332 A1 | 1/2019 | Fleming et al. |
| 2019/0018815 A1 | 1/2019 | Fleming et al. |
| 2019/0042217 A1 | 2/2019 | Glossop et al. |
| 2019/0042513 A1 | 2/2019 | Fleming, Jr. et al. |
| 2019/0101952 A1 | 4/2019 | Diamond et al. |
| 2019/0102179 A1 | 4/2019 | Fleming et al. |
| 2019/0102338 A1 | 4/2019 | Tang et al. |

FOREIGN PATENT DOCUMENTS

| | | |
|---|---|---|
| RU | 2374684 C1 | 11/2009 |
| WO | 2007031696 A1 | 3/2007 |
| WO | 2014/035449 A1 | 3/2014 |

OTHER PUBLICATIONS

Ibrahim Eng., Walaa Abd El Aziz, "Binary Floating Point Fused Multiply Add Unit", Faculty of Engineering, Cairo University Giza, Egypt, 2012, 100 Pages.
Notice of Allowance from U.S. Appl. No. 15/640,540, dated Mar. 14, 2019, 39 pages.
Notice of Allowance from U.S. Appl. No. 15/721,802, dated Mar. 18, 2019, 23 pages.
Abandonment from U.S. Appl. No. 15/640,544, dated Mar. 20, 2018, 2 pages.
Advisory Action from U.S. Appl. No. 14/037,468, dated Aug. 11, 2017, 3 pages.
Arvind., et al., "Executing a Program on the MIT Tagged-Token Dataflow Architecture," Mar. 1990, IEEE Transactions on Computers, vol. 39 (3), pp. 300-318.
Asanovic K, et al., "The Landscape of Parallel Computing Research: A View from Berkeley," Dec. 18, 2006, Electrical Engineering and Computer Sciences University of California at Berkeley, Technical Report No. UCB/EECS-2006-183, http://www.eecs.berkeley.edu/Pubs/TechRpts/2006/EECS-2006-183.html, 56 pages.
Ball T., "What's in a Region? or Computing Control Dependence Regions in Near-Linear Time for Reducible Control Flow," Dec. 1993, ACM Letters on Programming Languages and Systems, 2(1-4):1-16, 24 pages.
Bluespec, "Bluespec System Verilog Reference Guide," Jun. 16, 2010, Bluespec, Inc, 453 pages.
Bohm I., "Configurable Flow Accelerators," Mar. 3, 2016, XP055475839. retrieved from http://groups.inf.ed.ac.uk/pasta/areas_cfa.html on Oct. 25, 2018, 3 pages.
Burger D., et al., "Scaling to the End of Silicon with EDGE Architectures," Jul. 12, 2004, vol. 37 (7), pp. 44-55.
Carloni L.P., et al., "The Theory of Latency Insensitive Design," Sep. 2001, IEEE Transactions on Computer-Aided Design of Integrated Circuits and Systems, vol. 20 (9), 18 pages.
Chandy K.M., et al., "Parallel Program Design: A Foundation," Addison-Wesley Publishing Company, Aug. 1988, 552 pages.
Compton K., et al., "Reconfigurable Computing: A Survey of Systems and Software," ACM Computing Surveys, Jun. 2002, vol. 34 (2), pp. 171-210.
Cong J., et al., "Supporting Address Translation for Accelerator-Centric Architectures," Feb. 2017, IEEE International Symposium on High Performance Computer Architecture (HPCA), 12 pages.
"Coral Collaboration: Oak Ridge, Argonne, Livermore," Benchmark codes, downloaded from https://asc.llnl.gov/CORAL-benchmarks/ on Nov. 16, 2018, 6 pages.
Corrected Notice of Allowance from U.S. Appl. No. 15/721,802, dated Dec. 18, 2018, 8 pages.
Dally W.J., et al., "Principles and Practices of Interconnection Networks," Morgan Kaufmann, 2003, 584 pages.
Dennis J.B., et al., "A Preliminary Architecture for a Basic Data-Flow Processor," 1975, In Proceedings of the 2nd Annual Symposium on Computer Architecture, pp. 125-131.
Dijkstra E.W., "Guarded Commands, Nondeterminacy and Formal Derivation of Programs," Aug. 1975, Communications of the ACM, vol. 18 (8), pp. 453-457.
Eisenhardt S., et al., "Optimizing Partial Reconfiguration of Multi-Context Architectures," Dec. 2008, 2008 International Conference on Reconfigurable Computing and FPGAs, 6 pages.
Emer J., et al., "Asim: A Performance Model Framework," Feb. 2002, Computer, vol. 35 (2), pp. 68-76.
Emer J.S., et al., "A Characterization of Processor Performance in the VAX-11/780," In Proceedings of the 11th Annual International Symposium on Computer Architecture, Jun. 1984, vol. 12 (3), pp. 274-283.
Extended European Search Report for Application No. 17207172.2, dated Oct. 1, 2018, 14 pages.
Extended European Search Report for Application No. 17210484.6, dated May 29, 2018, 8 pages.
Final Office Action from U.S. Appl. No. 13/994,582, dated Oct. 3, 2017, 11 pages.
Final Office Action from U.S. Appl. No. 14/037,468, dated Jun. 1, 2017, 18 pages.
Final Office Action from U.S. Appl. No. 14/037,468, dated Jun. 15, 2018, 7 pages.
Final Office Action from U.S. Appl. No. 14/037,468, dated May 16, 2016, 24 pages.
Final Office Action from U.S. Appl. No. 14/037,468, dated Oct. 5, 2016, 17 pages.
Final Office Action from U.S. Appl. No. 15/396,049, dated Dec. 27, 2018, 38 pages.
Final Office Action from U.S. Appl. No. 15/721,809, dated Dec. 26, 2018, 46 pages.
Fleming K., et al., "Leveraging Latency-Insensitivity to Ease Multiple FPGA Design," In Proceedings of the ACM/SIGDA International Symposium on Field Programmable Gate Arrays, FPGA'12, Feb. 22-24, 2012, pp. 175-184.
Fleming K.E., et al., "Leveraging Latency-Insensitive Channels to Acheive Scalable Reconfigurable Computation," Feb. 2013, 197 pages.
Fleming et al., U.S. Appl. No. 15/396,038, titled "Memory Ordering in Acceleration Hardware," 81 pages, filed Dec. 30, 2016.
Fleming et al., U.S. Appl. No. 15/396,049, titled "Runtime Address Disambiguation in Acceleration Hardware," filed Dec. 30, 2016, 97 pages.
Govindaraju V., et al., "Dynamically Specialized Datapaths for Energy Efficient Computing," 2011, In Proceedings of the 17th International Conference on High Performance Computer Architecture, 12 pages.
Hauser J.R., et al., "Garp: a MIPS processor with a Reconfigurable Coprocessor," Proceedings of the 5th Annual IEEE Symposium on Field-Programmable Custom Computing Machines, 1997, 10 pages.
Hoogerbrugge J., et al., "Transport-Triggering vs. Operation-Triggering," 1994, In Compiler Construction, Lecture Notes in Computer Science, vol. 786, Springer, pp. 435-449.
Intel® Architecture, "Instruction Set Extensions and Future Features Programming Reference," 319433-034, May 2018, 145 pages.
Intel, "Intel® 64 and IA-32 Architectures Software Developer Manuals," Oct. 12, 2016, Updated—May 18, 2018, 19 pages.
International Preliminary Report on Patentability for Application No. PCT/RU2011/001049, dated Jul. 10, 2014, 6 pages.
International Search Report and Written Opinion for Application No. PCT/RU2011/001049, dated Sep. 20, 2012, 6 pages.
Kalte H., et al., "Context Saving and Restoring for Multitasking in Reconfigurable Systems," International Conference on Field Programmable Logic and Applications, Aug. 2005, pp. 223-228.
Kim et al., "Energy-Efficient and High Performance CGRA-based Multi-Core Architecture," Journal of Semiconductor Technology and Science, vol. 14 (3), Jun. 2014, 16 pages.
King M., et al., "Automatic Generation of Hardware/Software Interfaces," Proceedings of the 17th International conference on Architectural Support for Programming Languages and Operating Systems, ASPLOS'12, Mar. 2012, 12 pages.

(56) References Cited

OTHER PUBLICATIONS

Knuth D.E., et al., "Fast Pattern Matching in Strings," Jun. 1977, SIAM Journal of Computing, vol. 6(2), pp. 323-350.
Lee T., et al. "Hardware Context-Switch Methodology for Dynamically Partially Reconfigurable Systems," Journal of Information Science and Engineering, vol. 26, Jul. 2010, pp. 1289-1305.
Lewis D., et al., "The Stratix™ 10 Highly Pipelined FPGA Architecture," FPGA 2016, Altera, Feb. 23, 2016, 26 pages.
Lewis D., et al., "The Stratix™ 10 Highly Pipelined FPGA Architecture," FPGA'16, ACM, Feb. 21-23, 2016, pp. 159-168.
Li S., et al., "Case Study: Computing Black-Scholes with Intel® Advanced Vector Extensions," Sep. 6, 2012, 20 pages.
Marquardt A., et al., "Speed and Area Trade-OFFS in Cluster-Based FPGA Architectures," Feb. 2000, IEEE Transactions on Very Large Scale Integration (VLSI) Systems, vol. 8 (1), 10 pages.
Matsen F.A., et al., "The CMU warp processor," In Supercomputers: Algorithms, Architectures, and Scientific Computation, 1986, pp. 235-247.
McCalpin J.D., "Memory Bandwidth and Machine Balance in Current High Performance Computers," IEEE Computer Society Technical Committee on Computer Architecture (TCCA) Newsletter, Dec. 1995, 7 pages.
McCalpin J.D., "Stream: Sustainable memory bandwidth in high performance computers," 2016, 4 pages.
Mei B., et al., "ADRES: An Architecture with Tightly Coupled VLIW Processor and Coarse-Grained Reconfigurable Matrix," 2003, In Proceedings of International Conference on Field-Programmable Logic and Applications, 10 pages.
Merrill D., et al., "Revisiting sorting for GPGPU stream architectures," In Proceedings of the 19th International Conference on Parallel Architectures and Compilation Techniques (PACT'10), Feb. 2010, 17 pages.
Mirsky E., at al., "MATRIX: A Reconfigurable Computing Architecture with Configurable Instruction Distribution and Deployable Resources," 1996, In Proceedings of the IEEE Symposium on FPGAs for Custom Computing Machines, pp. 157-166.
Natalie E.J., et al., "On-Chip Networks," Synthesis Lectures on Computer Architecture, Morgan and Claypool Publishers, 2009, 148 pages.
Non-Final Office Action from U.S. Appl. No. 14/037,468, dated Oct. 19, 2017, 19 pages.
Non-Final Office Action from U.S. Appl. No. 15/396,402, dated Nov. 1, 2018, 22 pages.
Non-Final Office Action from U.S. Appl. No. 15/640,540, dated Oct. 26, 2018, 8 pages.
Non-Final Office Action from U.S. Appl. No. 15/640,543, dated Jan. 2, 2019, 46 pages.
Non-Final Office Action from U.S. Appl. No. 15/396,038, dated Oct. 5, 2018, 38 pages.
Non-Final Office Action from U.S. Appl. No. 15/396,049, dated Jun. 15, 2018, 33 pages.
Non-Final Office Action from U.S. Appl. No. 15/859,473, dated Oct. 15, 2018, 10 pages.
Non-Final Office Action from U.S. Appl. No. 13/994,582, dated Mar. 23, 2017, 9 pages.
Non-Final Office Action from U.S. Appl. No. 13/994,582, dated Feb. 7, 2018, 12 pages.
Non-Final Office Action from U.S. Appl. No. 14/037,468, dated Aug. 27, 2015, 10 pages.
Non-Final Office Action from U.S. Appl. No. 14/037,468, dated Dec. 2, 2016, 16 pages.
Non-Final Office Action from U.S. Appl. No. 15/396,395, dated Jul. 20, 2018, 18 pages.
Non-Final Office Action from U.S. Appl. No. 15/640,533, dated Apr. 19, 2018, 8 pages.
Non-Final Office Action from U.S. Appl. No. 15/640,534, dated Apr. 26, 2018, 8 pages.
Non-Final Office Action from U.S. Appl. No. 15/640,535, dated May 15, 2018, 13 pages.
Non-Final Office Action from U.S. Appl. No. 15/721,802, dated Mar. 8, 2018, 8 pages.
Non-Final Office Action from U.S. Appl. No. 15/721,809, dated Jun. 14, 2018, 12 pages.
Notice of Allowance from U.S. Appl. No. 15/640,534, dated Jan. 4, 2019, 37 pages.
Notice of Allowance from U.S. Appl. No. 15/721,802, dated Nov. 30, 2018, 30 pages.
Notice of Allowance from U.S. Appl. No. 15/640,533, dated Oct. 10, 2018, 8 pages.
Notice of Allowance from U.S. Appl. No. 15/640,535, dated Oct. 9, 2018, 7 pages.
Notice of Allowance from U.S. Appl. No. 15/640,538, dated Oct. 17, 2018, 10 pages.
Notice of Allowance from U.S. Appl. No. 13/994,582, dated Aug. 7, 2018, 8 pages.
Notice of Allowance from U.S. Appl. No. 14/037,468, dated Aug. 28, 2018, 9 pages.
Notice of Allowance from U.S. Appl. No. 15/396,395, dated Dec. 28, 2018, 36 pages.
Notice of Allowance from U.S. Appl. No. 15/640,534, dated Sep. 12, 2018, 7 pages.
Notice of Allowance from U.S. Appl. No. 15/719,281, dated Jan. 24, 2019, 36 pages.
Notice of Allowance from U.S. Appl. No. 15/721,802, dated Jul. 31, 2018, 6 pages.
Panesar G., et al., "Deterministic Parallel Processing," International Journal of Parallel Programming, Aug. 2006, vol. 34 (4), pp. 323-341.
Parashar A., et al., "Efficient Spatial Processing Element Control via Triggered Instructions," IEEE MICRO, vol. 34 (3), Mar. 10, 2014, pp. 120-137.
Parashar et al., "LEAP: A Virtual Platform Architecture for FPGAs," Intel Corporation, 2010, 6 pages.
Pellauer M., et aL, "Efficient Control and Communication Paradigms for Coarse-Grained Spatial Architectures," Sep. 2015, ACM Transactions on Computer Systems, vol. 33 (3), Article 10, 32 pages.
Pellauer M., et al., "Soft Connections: Addressing the Hardware-Design Modularity Problem," 2009, In Proceedings of the 46th ACM/IEEE Design Automation Conference (DAC'09), pp. 276-281.
Raaijmakers S., "Run-Time Partial Reconfiguration on the Virtex-11 Pro," 2007, 69 pages.
Schmit H., et al., "PipeRench: A Virtualized Programmable Datapath in 0.18 Micron Technology," 2002, IEEE 2002 Custom Integrated Circuits Conference, pp. 63-66.
Shin T., et aL, "Minimizing Buffer Requirements for Throughput Constrained Parallel Execution of Synchronous Dataflow Graph," ASPDAC'11 Proceedings of the 16th Asia and South Pacific Design Automation Conference, Jan. 2011, 6 pages.
Smith A., et al., "Dataflow Predication," 2006, In Proceedings of the 39th Annual IEEE/ACM International Symposium on Microarchitecture, 12 pages.
Swanson S., et al., "The WaveScalar Architecture," May 2007, ACM Transactions on Computer Systems, vol. 25 (2), Article No. 4, 35 pages.
Taylor M.B., et al., "The Raw Microprocessor: A Computational Fabric for Software Circuits and General-Purpose Programs," 2002, IEEE Micro, vol. 22 (2), pp. 25-35.
Truong D.N., et al., "A 167-Processor Computational Platform in 65 nm CMOS," IEEE Journal of Solid-State Circuits, Apr. 2009, vol. 44 (4), pp. 1130-1144.
Van De Geijn R.A., et al., "SUMMA: Scalable Universal Matrix Multiplication Algorithm," 1997, 19 pages.
Vijayaraghavan M., et al., "Bounded Dataflow Networks and Latency-Insensitive Circuits," In Proceedings of the 7th IEEE/ACM International Conference on Formal Methods and Models for Codesign (MEMOCODE'09), Jul. 13-15, 2009, pp. 171-180.
Wikipedia, The Free Encyclopedia, "Priority encoder," https://en.wikipedia.org/w/index.php?Title=Priority_encoder&oldid=746908667, revised Oct. 30, 2016, 2 pages.

(56) References Cited

OTHER PUBLICATIONS

Wikipedia, The Free Encyclopedia, "Truth table," Logical Implication Table, https://enwikipedia.org/wiki/Truth_table#Logical_implication, revised Nov. 18, 2016, 1 page.
Wikipedia, "TRIPS Architecture," retrieved from https://en.wikipedia.org/wiki/TRIPS_architecture on Oct. 14, 2018, 4 pages.
Williston, Roving Reporter, Intel® Embedded Alliance, "Roving Reporter: FPGA+ Intel® Atom TM=Configurable Processor," Dec. 2010, 5 pages.
Ye Z.A., et al., "CHIMAERA: A High-Performance Architecture with a Tightly-Coupled Reconfigurable Functional Unit," Proceedings of the 27th International Symposium on Computer Architecture (ISCA'00), 2000, 11 pages.
Yu Z., et al., "An Asynchronous Array of Simple Processors for DSP Applications," IEEE International Solid-State Circuits Conference, ISSCC'06, Feb. 8, 2006, 10 pages.
"Benchmarking DNN Processors," Nov. 2016, 2 pages.
Chen Y., et al., "Eyeriss: A Spacial Architecture for Energy-Efficient Dataflow for Convolutional Neural Networks," Jun. 2016, 53 pages.
Chen Y., et al, "Eyeriss: A Spacial Architecture for Energy-Efficient Dataflow for Convolutional Neural Networks," International Symposium on Computer Architecture (ISCA), Jun. 2016, pp. 367-379.
Chen Y., et al., "Eyeriss: An Energy-Efficient Reconfigurable Accelerator for Deep Convolutional Neural Networks," IEEE International Conference on Solid-State Circuits (ISSCC), Feb. 2016, pp 262-264.
Chen Y., et al., "Eyeriss: An Energy-Efficient Reconfigurable Accelerator for Deep Convolutional Neural Networks," IEEE International Solid-State Circuits Conference, ISSCC, 2016, 9 pages.
Chen Y., et al., "Eyeriss: An Energy-Efficient Reconfigurable Accelerator for Deep Convolutional Neural Networks," IEEE International Solid-State Circuits Conference, ISSCC 2016, Digest of Technical Papers, retrieved from eyeriss-sscc2016, spreadsheet, http://eyeriss.mit.edu/benchmarking.html, 2016, 7 pages.
Chen Y., et al., "Eyeriss: An Energy-Efficient Reconfigurable Accelerator for Deep Convolutional Neural Networks," IEEE Journal of Solid State Circuits (JSSC), ISSCC Special Issue, Jan. 2017, vol. 52 (1), pp. 127-138.
Chen Y., et al., "Eyeriss v2: A Flexible and High-Performance Accelerator for Emerging Deep Neural Networks," Jul. 2018, 14 pages.
Chen Y., et al., "Understanding the Limitations of Existing Energy-Efficient Design Approaches for Deep Neural Networks," Feb. 2018, 3 pages.
Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.
Corrected Notice of Allowance from U.S. Appl. No. 15/640,535, dated Feb. 13, 2019, 7 pages.
Emer J., et al., "Hardware Architectures for Deep Neural Networks at CICS/MTL Tutorial," Mar. 27, 2017, 258 pages.
Emer J., et al., "Hardware Architectures for Deep Neural Networks at ISCA Tutorial," Jun. 24, 2017, 290 pages.
Emer J., et al., "Hardware Architectures for Deep Neural Networks at MICRO-49 Tutorial," Oct. 16, 2016, 300 pages.
Emer J., et al., "Tutorial on Hardware Architectures for Deep Neural Networks," Nov. 2016, 8 pages.
Final Office Action from U.S. Appl. No. 15/396,038, dated Mar. 11, 2019, 36 pages.
Final Office Action from U.S. Appl. No. 15/859,473, dated Feb. 26, 2019, 13 pages.
"Full Day Tutorial Held at MICRO-49," Oct. 15-19, 2016, retrieved from https://www.microarch.org/micro49/ on Feb. 14, 2019, 2 pages.
Han S., et al., "Deep Compression: Compressing Deep Neural Networks with Pruning, Trained Quantization and Huffman Coding," ICLR, Feb. 2016, 14 pages.
Han S., et al., "EIE: Efficient Inference Engine on Compressed Deep Neural Network," 43rd ACM/IEEE Annual International Symposium on Computer Architecture, ISCA 2016, Seoul, South Korea, Jun. 18-22, 2016, retrieved from eie-isca2016, spreadsheet, http://eyeriss.mit.edu/benchmarking.html, 7 pages.
Han S., et al., "EIE: Efficient Inference Engine on Compressed Deep Neural Network," ISCA, May 2016, 12 pages.
Hsin Y., "Building Energy-Efficient Accelerators for Deep Learning," at Deep Learning Summit Boston, May 2016, retrieved from https://www.re-work.co/events/deep-learning-boston-2016 on Feb. 14, 2019, 10 pages.
Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.
Non-Final Office Action from U.S. Appl. No. 15/719,285, dated Feb. 25, 2019, 47 pages.
Non-Final Office Action from U.S. Appl. No. 15/855,964, dated Dec. 13, 2018, 13 pages.
Notice of Allowance from U.S. Appl. No. 14/037,468, dated Mar. 7, 2019, 51 pages.
Notice of Allowance from U.S. Appl. No. 15/640,533, dated Feb. 14, 2019, 43 pages.
Notice of Allowance from U.S. Appl. No. 15/640,535, dated Feb. 6, 2019, 38 pages.
Suleiman A., et al., "Towards Closing the Energy Gap Between HOG and CNN Features for Embedded Vision," IEEE International Symposium of Circuits and Systems (ISCAS), May 2017, 4 pages.
Sze V., "Designing Efficient Deep Learning Systems," in Mountain View, CA, Mar. 27-28, 2019, retrieved from https://professional.mit.edu/programs/short-programs/designing-efficient-deep-learning-systems-OC on Feb. 14, 2019, 2 pages.
Sze V., et al., "Efficient Processing of Deep Neural Networks: A Tutorial and Survey," Mar. 2017, 32 pages.
Sze V., et al., "Efficient Processing of Deep Neural Networks: A Tutorial and Survey," Proceedings of the IEEE, Dec. 2017, vol. 105 (12), pp. 2295-2329.
Sze V., et al., "Hardware for Machine Learning: Challenges and Opportunities," IEEE Custom Integrated Circuits Conference (CICC), Oct. 2017, 9 pages.
"Tutorial at MICRO-50," The 50th Annual IEEE/ACM International Symposium on Microarchitecture, Oct. 14-18, 2017, retrieved from https://www.microarch.org/micro50/ on Feb. 14, 2019, 3 pages.
"Tutorial on Hardware Architectures for Deep Neural Networks at ISCA 2017," The 44th International Symposium on Computer Architecture, Jun. 24-28, 2017, retrieved from http://isca17.ece.utoronto.ca/doku.php on Feb. 14, 2019, 2 pages.
Yang T., et al., "Deep Neural Network Energy Estimation Tool," IEEE Conference on Computer Vision and Pattern Recognition CVPR 2017, Jul. 21-26, 2017, retrieved from https://energyestimation.mit.edu/ on Feb. 21, 2019, 4 pages.
Yang T., et al., "NetAdapt: Platform-Aware Neural Network Adaptation for Mobile Applications," European Conference on Computer Vision (ECCV), Version 1, Apr. 9, 2018, 16 pages.
Yang T., et al ., "A Method to Estimate the Energy Consumption of Deep Neural Networks," Asilomar Conference on Signals, Systems and Computers, Oct. 2017, 5 pages.
Yang T., et al ., "Designing Energy-Efficient Convolutional Neural Networks using Energy-Aware Pruning," IEEE Conference on Computer Vision and Pattern Recognition (CVPR), Jul. 2017, 9 pages.
Yang T., et al., "Designing Energy-Efficient Convolutional Neural Networks using Energy-Aware Pruning," IEEE Conference on Computer Vision and Pattern Recognition CVPR 2017, Jul. 21-26, 2017, retrieved from http://www.rle.mit.edu/eems/wp-content/uploads/2017/07/2017_cvpr_poster.pdf on Feb. 21, 2019, 1 page.
Yang T., et al., "Designing Energy-Efficient Convolutional Neural Networks using Energy-Aware Pruning," IEEE CVPR, Mar. 2017, 6 pages.
Yang T., et al., "NetAdapt: Platform-Aware Neural Network Adaptation for Mobile Applications," European Conference on Computer Vision (ECCV), Version 2, Sep. 28, 2018, 16 pages.
Corrected Notice of Allowance from U.S. Appl. No. 14/037,468, dated Apr. 1, 2019, 10 pages.
Non-Final Office Action from U.S. Appl. No. 15/640,542, dated Apr. 2, 2019, 59 pages.

(56) References Cited

OTHER PUBLICATIONS

Notice of Allowance from U.S. Appl. No. 15/640,534, dated Apr. 2, 2019, 9 pages.

* cited by examiner

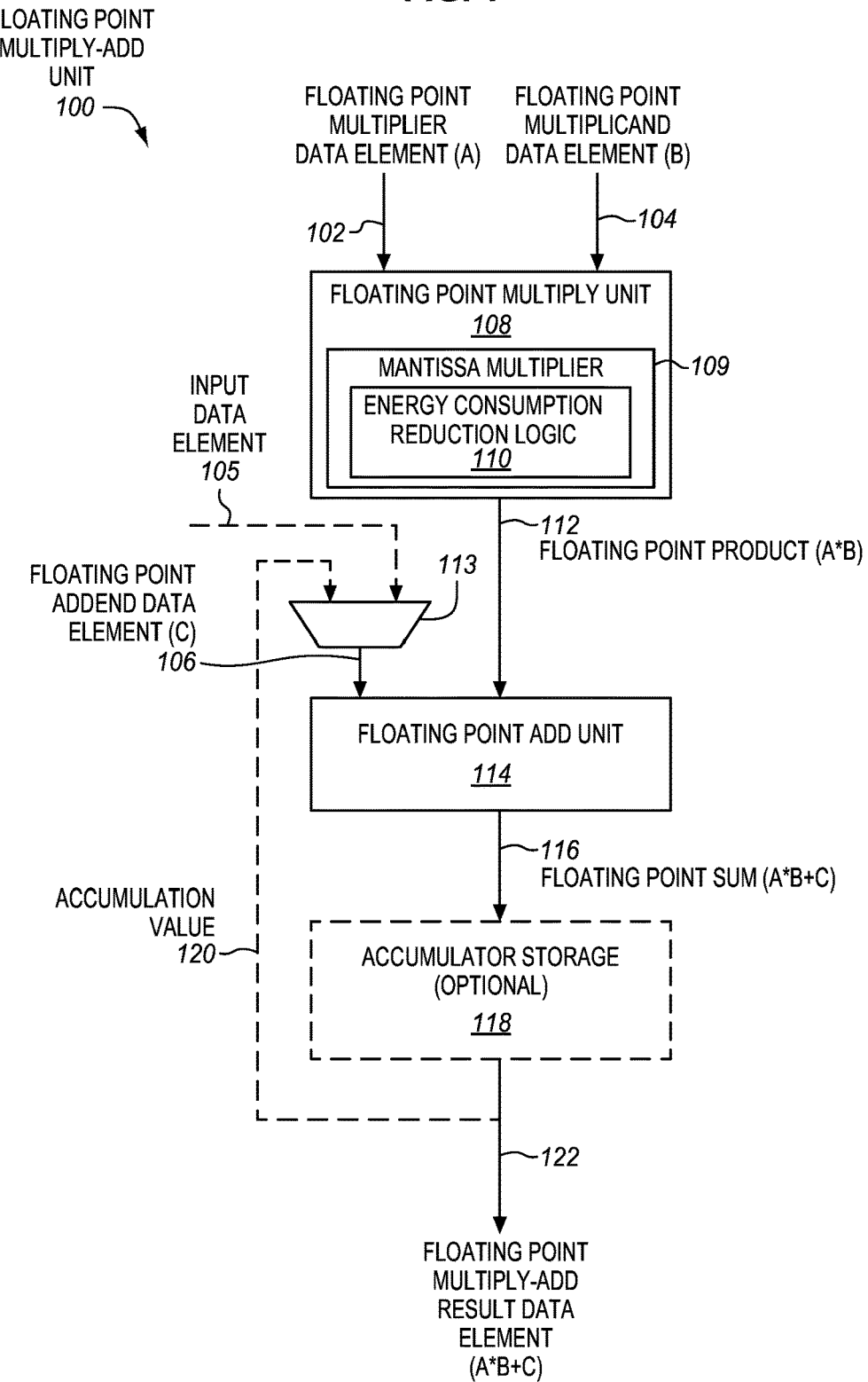

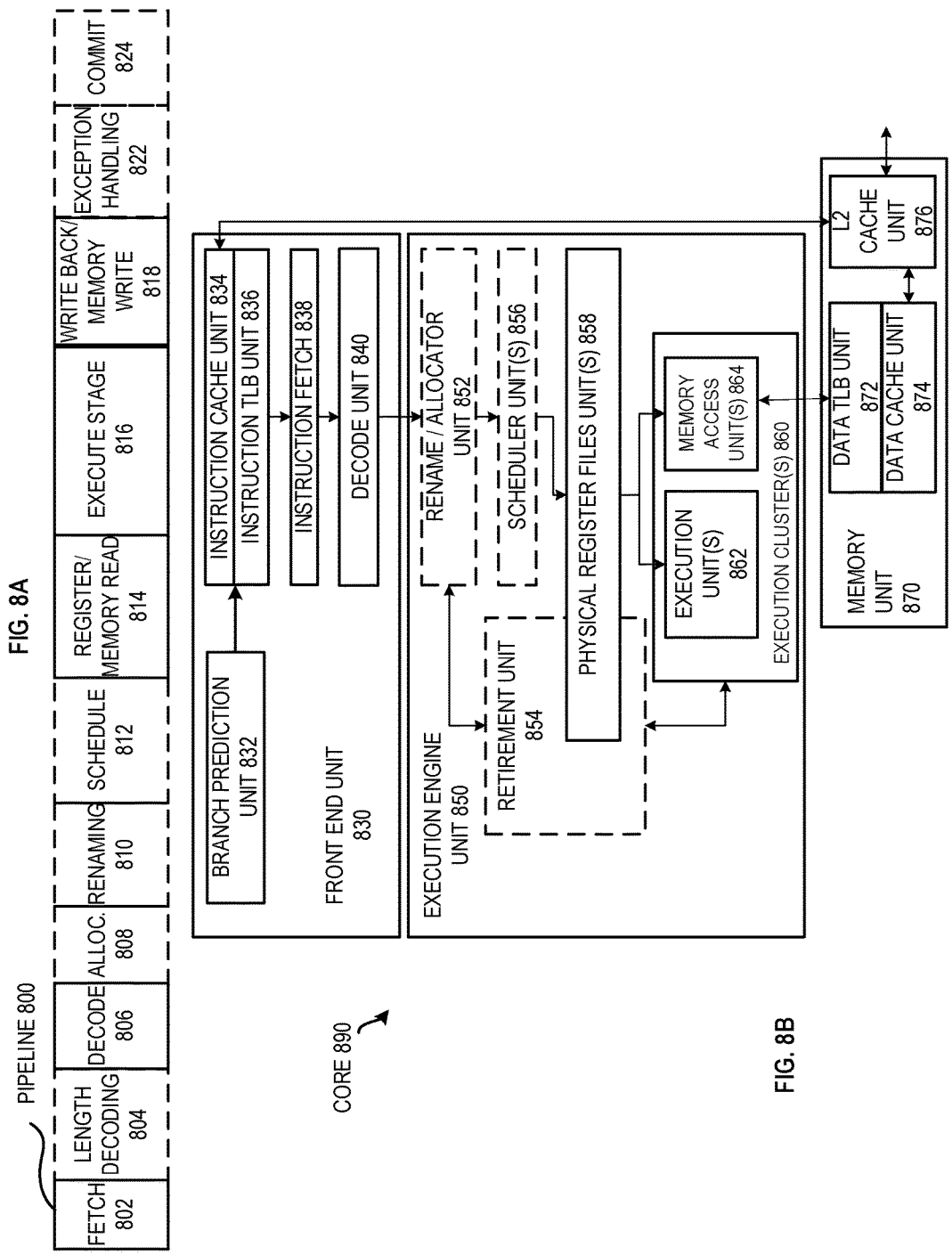

LOW ENERGY CONSUMPTION MANTISSA MULTIPLICATION FOR FLOATING POINT MULTIPLY-ADD OPERATIONS

STATEMENT OF GOVERNMENT INTEREST

This invention was made with Government support under contract number 7216501 awarded by the Department of Energy. The Government has certain rights in this invention.

BACKGROUND

Technical Field

Embodiments described herein generally relate to processors. In particular, embodiments described herein generally relate to processors to perform floating point multiply-add operations.

Background Information

Floating point multiply-add operations are widely used in computing and data processing. For example, floating point multiply-add operations are commonly used in signal processing, scientific computing, graphics, big data processing, machine learning, and the like.

Many processors have floating point multiply-add units to perform the floating point multiply-add operations. In some cases, instructions in the instruction set of the processor may be used to control these units to perform the floating point multiply-add operations.

BRIEF DESCRIPTION OF THE DRAWINGS

The invention may best be understood by referring to the following description and accompanying drawings that are used to illustrate embodiments. In the drawings:

FIG. 1 is a block diagram of an embodiment of a floating point multiply-add unit having mantissa multiplier energy consumption reduction logic.

FIG. 8A is a block diagram illustrating an embodiment of an in-order pipeline and an embodiment of a register renaming out-of-order issue/execution pipeline.

FIG. 8B is a block diagram of an embodiment of processor core including a front end unit coupled to an execution engine unit and both coupled to a memory unit.

DETAILED DESCRIPTION OF EMBODIMENTS

Figure 2A:
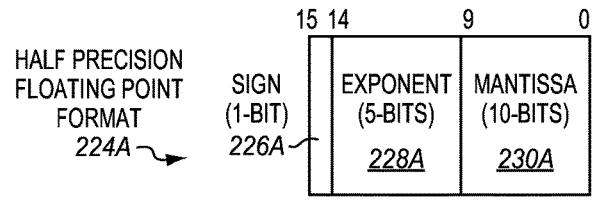
FIGS. 2A-2D are block diagrams of floating point formats that are suitable for embodiments.

Disclosed herein are embodiments of energy consumption reduction logic for mantissa multipliers of floating point multiply-add units. In the following description, numerous specific details are set forth (e.g., specific floating point multiply-add units, types of multipliers, multiplier sizes, processor configurations, micro-architectural details, and sequences of operations). However, embodiments may be practiced without these specific details. In other instances, well-known circuits, structures and techniques have not been shown in detail to avoid obscuring the understanding of the description.

FIG. 1 is a block diagram of an embodiment of a floating point multiply-add unit 100 having mantissa multiplier energy consumption reduction logic 110. The floating point multiply-add unit may be operative to perform a floating point multiply-add operation. In some embodiments, the floating point multiply-add unit may be operative to perform the floating point multiply-add operation in response to a floating point multiply-add instruction, although the scope of the invention is not so limited. In such embodiments the floating point multiply-add unit may represent an execution unit to perform the instruction.

The floating point multiply-add unit 100 may be included in various different types of integrated circuit products. In some embodiments, the floating point multiply-add unit may be included in a processor. In some cases, the processor may be a general-purpose processor (e.g., a general-purpose microprocessor or central processing unit (CPU) of the type used in desktop computers, laptop computers, servers, or cell phones). Alternatively, the processor may be a special-purpose processor. Examples of suitable special-purpose processors include, but are not limited to, digital signal processors (DSPs), graphics processors, communications processors, network processors, cryptographic processors, co-processors, embedded processors, and controllers (e.g., microcontrollers). The processor may also include other processor components, such as, for example, various different combinations and configurations of the components shown and described for any of FIGS. 8A, 8B, 9A, 9B, 10. In some cases, the floating point multiply-add unit may optionally be included in a processor or other apparatus having a configurable architecture, such as, for example, a field-programmable gate array (FPGA), a coarse-grained reconfigurable array (CGRA), or the like. In some embodiments, the floating point multiply-adder unit may be disposed on at least one integrated circuit or semiconductor die.

During operation, a floating point multiplier data element (A) 102, a floating point multiplicand data element (B) 104, and a floating point addend data element (C) 106 may be provided as inputs to the floating point multiply-add unit 100. By way of example, these may represent source operands of a floating point multiply-add instruction.

The floating point multiply-add unit may include a floating point multiply unit 108 coupled with a floating point add unit 114. The floating point multiply unit 108 may be coupled to receive the floating point multiplier data element (A) as a first input, and the floating point multiplicand data element (B) as a second input. For example, the multiply unit may have input ports, an input interface, or other inputs that are coupled (e.g., with storage locations) to receive these inputs. The floating point multiply unit may be operative to multiply the floating point multiplier data element (A) and the floating point multiplicand data element (B) to generate and output a floating point product (A*B) 112. Multiplication of floating point numbers generally involves multiplying mantissas of the floating point numbers, and summing exponents of the floating point numbers, taking into account the exponent bias. The floating point multiply unit may include a mantissa multiplier 109 to multiply the mantissas.

The floating point add unit 114 may be coupled to receive the floating point product (A*B) 112, and the floating point addend data element (C) 106. For example, the floating point add unit may have an input port, an input interface, or other input that is coupled with an output port, output interface, or other output of the floating point multiplier unit 108 to receive the floating point product (A*B). In some cases, the floating point addend data element may optionally be a floating point accumulation value 120, which may be output from an optional accumulator storage 118 (e.g., an accumulator register), although this is not required. In such cases, the floating point add unit may have an input port, an input interface, or other input, which is coupled with an output port, output interface, or other output of the optional accumulator storage 118, to receive the accumulation value 120 as the floating point addend data element (C). Alternatively, the optional accumulator storage may be omitted, and the floating point add unit may have an input that is coupled with a source register or other storage location to receive an input floating point data element 105, which does not represent an accumulation value, as the floating point addend data element (C). In some cases, an optional multiplexer or other selector 113 may be used to select either the input data element 105 or the accumulation value 120 as the addend data element (C).

The floating point add unit 114 may be operative to add the floating point product (A*B) 112 and the floating point addend data element (C) 106 to generate and output a floating point sum (A*B+C) 116. The floating point sum 116 may also be output as a floating point multiply-add result data element (A*B+C) 122. The floating point multiply-add unit may have an output that is coupled with a destination register or other storage location that is to be used to store the floating point multiply-add result data element (A*B+C) 122. In some embodiments, when the optional accumulator storage 118 is implemented, the floating point sum 116 may also optionally be stored in the accumulator storage. During a subsequent multiply-add operation, the floating point sum 116 may be output from the accumulator storage as the accumulation value 120. By way of example, a number of multiply-accumulate operations may be performed to sequentially update the accumulation value with a corresponding number of floating point products, such that over time the magnitude of the accumulation value may increase.

In some embodiments, the floating point multiply-add unit may optionally perform two separate floating point rounding operations. One rounding operation may be performed on the floating point product 112 before addition in the floating point add unit 114, and another rounding operation may be performed after the addition in the floating point add unit to produce the floating point sum 116. In other embodiments, the floating point multiply-add unit may optionally perform only one floating point rounding operation. This single floating point rounding operation may be performed after the addition in the floating point add unit to produce the floating point sum 116. Such a floating point multiply-add operation with only one floating point rounding operation is sometimes referred to as a fused floating point multiply-add operation. Either approach is suitable for the embodiments disclosed herein.

As mentioned above, the floating point multiply unit 108 may include as a sub-unit a mantissa multiplier 109. In some embodiments, as will be explained further below, the mantissa multiplier 109 and/or the floating point multiply-add unit 100 may include mantissa multiplier energy consumption reduction logic 110. In some embodiments, the mantissa multiplier energy consumption reduction logic may be operative to reduce energy consumption of the mantissa multiplier by gating (e.g., clock and/or data gating) a least significant (e.g., lowest order) bit portion of the mantissa multiplier, which is responsible for generating a least significant (e.g., lowest order) bit portion of the mantissa product, in cases where the least significant bit portion of the mantissa product does not affect the final floating point multiply-add result data element 122. In some embodiments, the mantissa multiplier energy consumption reduction logic may reduce energy consumption by an amount that is based, at least in part, on the floating point addend data element (C) 106 (e.g., its exponent). For example, in some embodiments, a portion of the mantissa multiplier that is gated may be based, at least in part, on the floating point addend data element (C) 106 (e.g., its exponent).

In FIG. 1, a single "scalar" floating point multiply-add unit has been shown and described. However, other embodiments pertain to a packed, vector, or single instruction, multiple data (SIMD) floating point multiply-add unit that includes multiple such floating point multiply-add units coupled together in a packed, vector, or SIMD fashion (e.g., corresponding to different lanes and with breaks in the carry chain between the different SIMD lanes).

A number of different floating point formats are suitable for the floating point multiplier, multiplicand, addend, and multiply-add result data elements disclosed herein. Such floating point formats typically apportion the bits of the floating point number into constituent fields known as the sign, mantissa, and exponent. The sign, mantissa, and exponent are related as shown in Equation 1:

$$A = (-1)^{sign} * mantissa * base^{exponent} \qquad \text{Equation 1}$$

The expression "$(-1)^{sign}$" represents negative one raised to the power of the sign. This expression evaluates whether the floating point number is positive (+) or negative (−). For example, when the sign is integer zero, the floating point number is positive, whereas when the sign is integer one, the floating point number is negative.

The mantissa may include a digit string of a length that is based on the type or precision of the floating point number. The mantissa is also sometimes referred to as the significand, the coefficient, or the fraction. The radix point (e.g., the decimal point for decimal format, or the binary point for binary format) is commonly implicitly assumed to reside at a fixed position. For example, the radix point may be implicitly assumed to be just to the right of the leftmost or most significant digit of the mantissa. By way of example, one possible mantissa in binary may be "1.10010010000111111011011", although this is only one illustrative example. The most significant (leftmost as viewed) bit in this mantissa is known as the J-bit. The J-bit is implicitly assumed to be binary 1, and is generally not stored in the floating point format, but rather is an implicit or hidden bit that provides additional precision (e.g., for a single precision floating point number there are 24-bits of mantissa precision including the explicit 23-bits and the implicit 1-bit). The radix point is implicitly assumed to follow the J-bit. Such a format is sometimes referred to as a "normal" format.

The expression "base^exponent" represents the base raised to the power of the exponent. The base is sometimes referred to as the radix. The exponent is also referred to as a characteristic or scale. The base is commonly base 2 (for binary), base 10 (for decimal), or base 16 (for hexadecimal). In most cases of floating point numbers in processors, the base is implicit or assumed to be base 2 (i.e., binary), and is not stored separately in the floating point formats. Raising the base to the power of the exponent effectively shifts the radix point (e.g., from the aforementioned implicit or assumed starting position) by the exponent number of digits. The radix point is shifted to the right if the exponent is positive, or to the left if the exponent is negative.

FIGS. 2A-2D are block diagrams illustrating examples of floating point formats that are suitable for embodiments. The Institute of Electrical and Electronics Engineers (IEEE) has standardized these formats, as well as several other less commonly used formats (which are also suitable), in various versions of the standard IEEE 754.

FIG. 2A illustrates a 16-bit half precision floating point format 224A. The half precision floating point format includes a 10-bit mantissa 230A in bits [9:0], a 5-bit exponent 228A in bits [14:10], and a 1-bit sign 226A in bit [15].

Figure 2B:
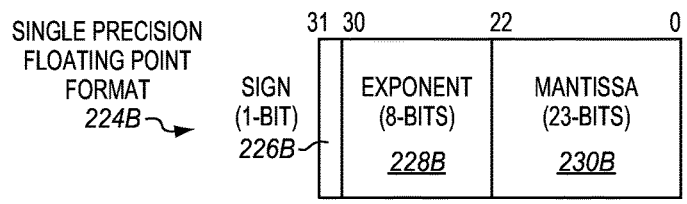

FIG. 2B illustrates a 32-bit single precision floating point format 223. The single precision floating point format includes a 23-bit mantissa 230B in bits [22:0], an 8-bit exponent 228B in bits [30:23], and a 1-bit sign 226B in bit [31].

Figure 2C:
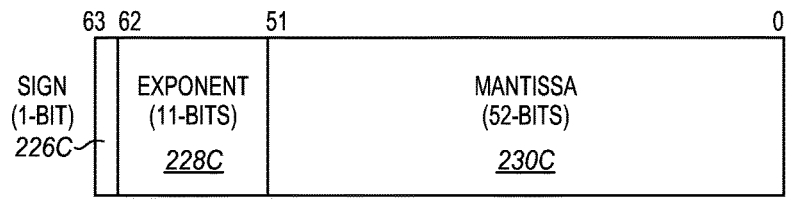

FIG. 2C illustrates a 64-bit double precision floating point format 223. The double precision floating point format includes a 52-bit mantissa 230C in bits [51:0], an 11-bit exponent 228C in bits [62:52], and a 1-bit sign 226C in bit [63].

Figure 2D:
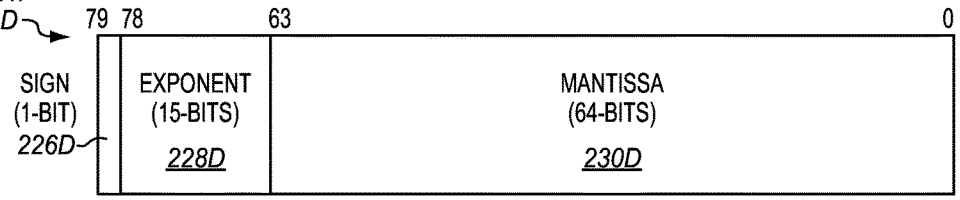

FIG. 2D illustrates an 80-bit extended double precision floating point format 224. The extended double precision floating point format includes a 64-bit mantissa 230D in bits [63:0], a 15-bit exponent 228D in bits [78:64], and a 1-bit sign 226D in bit [79].

Figure 3:
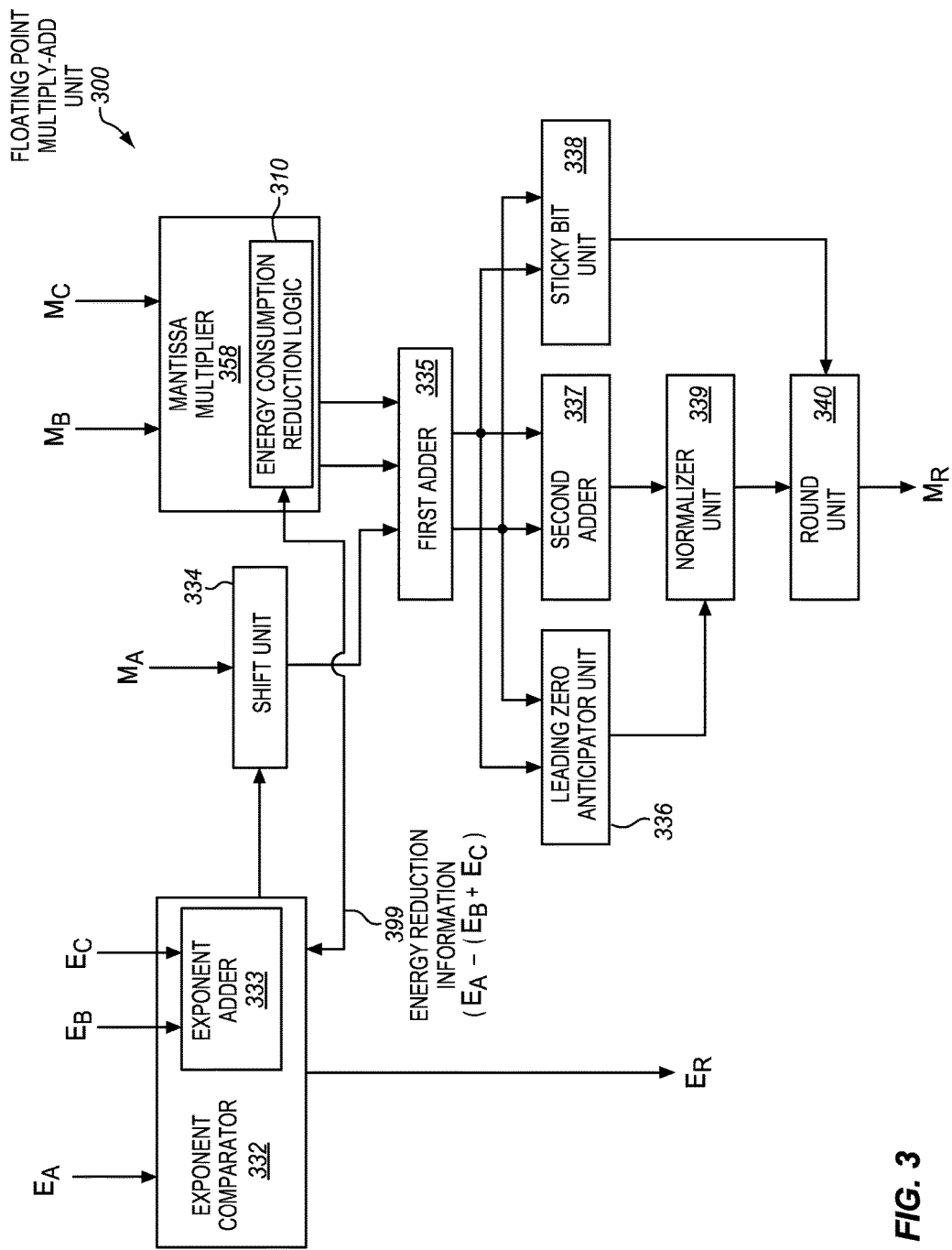
FIG. 3 is a block diagram of a detailed example embodiment of a suitable floating point multiply-add unit having mantissa multiplier energy consumption reduction logic.

FIG. 3 is a block diagram of a detailed example embodiment of a suitable floating point multiply-add unit 300 having mantissa multiplier energy consumption reduction logic 310. It is to be appreciated that this is just one illustrative example of a suitable floating point multiply-add unit design. Other suitable floating point multiply-add units are also suitable.

The floating point multiply-add unit includes an exponent comparator 332 that includes an exponent adder 333. The multiplier exponent (EB) and multiplicand exponent (EC) may be provided to the exponent adder, which may add these exponents. The addend exponent (EA) may also be provided to the exponent comparator. The exponent comparator may subtract or otherwise compare the addend exponent with the sum of the multiplier and multiplicand exponents and select a maximum as the result exponent (ER). The sum of the exponents of the multiplier and the multiplicand gives an exponent that is within one of the actual exponent (e.g., the actual exponent may be the sum of the exponents, or the sum of the exponents plus one). Based on this comparison, the exponent comparator may also control a shift unit 334 to perform a shift on an input addend mantissa (MA).

A multiplier mantissa (MB) and multiplicand mantissa (MC) may be input to the mantissa multiplier 358. The mantissa multiplier may multiply these mantissas to form a mantissa product. Outputs of the shift unit and the mantissa multiplier may be input to a first adder (e.g., a carry save adder (CSA)) 335. Outputs of the first adder are coupled with a leading zero anticipator unit 336, a second adder (e.g., a carry propagate adder (CPA)) 337, and a sticky bit unit 338 to perform sticky bit calculation. The addition of the aligned mantissa product and the addend mantissa may be performed initially with the first adder (e.g., a carry save adder) and then with the second adder (e.g., a carry propagate adder). Outputs of the leading zero anticipator unit and the second adder are coupled with a normalizer unit. The anticipation of the leading zeroes may be used in the normalization. An output of the normalizer unit, and an output of the sticky bit unit, are coupled as inputs to a round unit 340. The rounding may be performed based on the calculated sticky bit. The round unit may output a result mantissa (MR).

As shown, in some embodiments, the mantissa multiplier may include the energy consumption reduction logic 310. Any of the energy consumption reduction logic described elsewhere herein is suitable. In some embodiments, the exponent comparator 332 may optionally be coupled with the energy consumption reduction logic. In some embodiments, the exponent comparator may also provide energy consumption reduction information 399 to the energy consumption reduction logic 310. As one example, the information may include a difference between the addend exponent and the sum of the multiplier and multiplicand exponents (e.g., EA−(EB+EC)). As another example, the information may include a shift amount associated with aligning the radix points of the mantissa product and the addend. In some embodiments, the energy consumption reduction logic 310 may be operative to reduce energy consumption by an amount that is based, at least in part, on the floating point addend data element (e.g., its exponent). For example, in some embodiments, a portion of the mantissa multiplier that is gated may be based, at least in part, on the floating point addend data element (e.g., its exponent).

Very commonly, the result of a floating point multiply-add operation, performed on floating point numbers in normal form with an implied leading one in the mantissa, is not affected by a least significant (e.g., lowest order) bit portion of the product of the mantissas. Consider an n-bit mantissa (A) of a multiplier, an n-bit mantissa (B) of a multiplicand, and an n-bit mantissa (C) of an addend:

A: 1.a0a1 . . . an−1
B: 1.b0b1 . . . bn−1
C: 1.c0c1 . . . cn−1

Due to the normal format: $1 \leq A < 2$; $1 \leq B < 2$; $1 \leq C < 2$; and $1 \leq A*B < 4$. Also, the final multiply-add result will be in normal form. The binary point of the product of the multiplier and the multiplicand will generally be aligned with that of the addend before the addition. For example, the 2n-bits of the product may be shifted based on the exponent of the addend in order to achieve such alignment. The multiply-add result will generally only include the first n-bits after the leading-1 or J-bit of the sum of the product and the addend. Due in part to such truncation from 2n-bits to n-bits, the least significant bit portion of the product of the mantissas very commonly does not affect the final multiply-add result (e.g., the architecturally visible value stored in a register). Additionally, shifting or otherwise aligning the product based on the exponent of the addend may further make the product of the mantissas not affect or change the final multiply-add result. This may tend to be especially the case when the addend (e.g., an accumulation value) is significantly larger than (e.g., has a greater exponent than) the product of the multiplier and the multiplicand. In such cases, the product may be significantly shifted in order to align its radix point with that of the addend. Moreover, in many cases the accumulation value may be significantly larger than the product, for example, when multiple products sequentially accumulated into the accumulation value.

Figure 4:
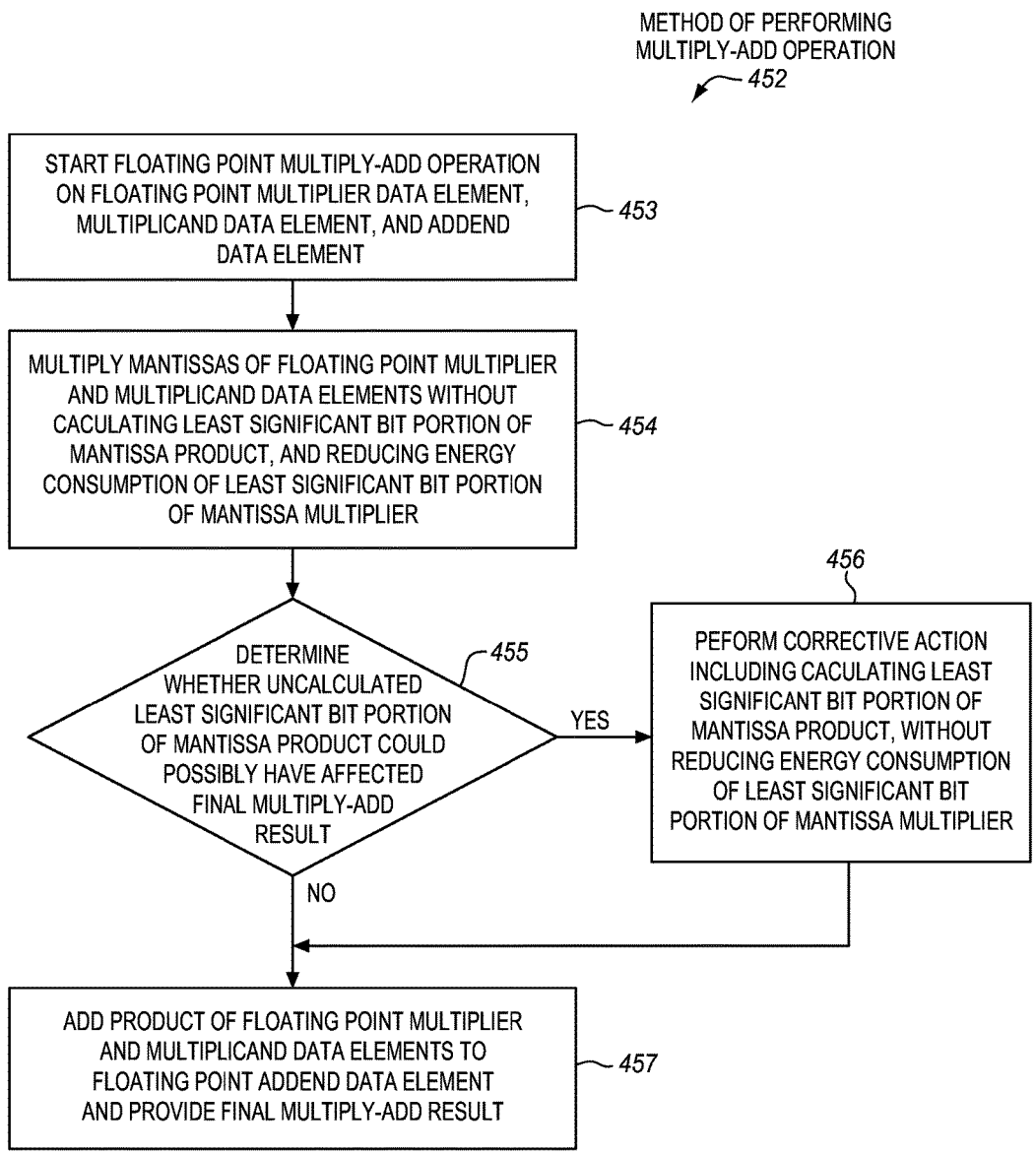
FIG. 4 is a block flow diagram of an embodiment of a method of performing a floating point multiply-add operation without calculating a least significant portion of a mantissa product and determining whether the uncalculated portion could have affected a final multiply-add result.

FIG. 4 is a block flow diagram of an embodiment of a method 452 of performing a floating point multiply-add operation, without calculating a least significant bit portion of a mantissa product, and determining whether the uncalculated least significant bit portion could possibly have affected the final multiply-add result. In various embodiments, the method may be performed by a floating point multiply-add unit, a processor, a digital logic device, or integrated circuit. In some embodiments, the method may be performed by and/or with the floating point multiply-add unit of FIG. 1 and/or FIG. 3. The components, features, and specific optional details described for these floating point multiply-add units may also optionally apply to the method 452. Alternatively, the method 452 may be performed by and/or within a similar or different floating point multiply-add unit, processor, or apparatus. Moreover, the floating point multiply-add units of FIG. 1 and/or FIG. 3 may perform methods the same as, similar to, or different than the method 452.

At block 453, a floating point multiply-add operation may be started on a floating point multiplier data element, a floating point multiplicand data element, and a floating point addend data element. In some embodiments, this may be performed in response to a multiply-add instruction indicating these data elements as source operands, although the scope of the invention is not so limited.

At block 454, mantissas of the floating point multiplier and multiplicand data elements may be multiplied, without calculating a least significant bit portion of the mantissa product. In some embodiments, this may include gating (e.g., clock and/or data gating), or otherwise reducing power to and/or energy consumption of, a corresponding least significant bit portion of a mantissa multiplier that is being used to multiply the mantissas.

At block 455, a determination may be made whether the uncalculated least significant bit portion of the mantissa product could possibly have affected the final multiply-add result. This may be done in various different ways in different embodiments as will be discussed further below in conjunction with FIG. 5. If the determination is that the uncalculated least significant bit portion of the mantissa product could possibly have affected the final multiply-add result (i.e., "yes" is the determination at block 455), the method may advance to block 456.

At block 456, a corrective action may be performed. In some embodiments, this corrective action may include calculating the previously uncalculated least significant bit portion of the mantissa product. This may be done in different ways in different embodiments. In some embodiments, the entire mantissa product, including the least significant bit portion thereof (i.e., without gating it and/or without reducing power consumption to an extend that the calculations aren't performed), may optionally be fully calculated. For example, the prior calculation results may be flushed or discarded from the pipeline, and the entire calculation may be restarted in the pipeline from the beginning this time include the gated region in the calculation. Such an approach may tend to have relatively low latency for the situations where the gated region is not needed, but relatively high latency or penalty of a full pipeline replay when the gated region is needed. In other embodiments, there may be no need to replay the entire calculation. Rather, only the least significant bit portion of the mantissa product may optionally be selectively calculated when appropriate. For example, a relatively longer pipeline may be used that has the least significant bit portion of the mantissa product in a subsequent portion of the pipeline, which may be selectively calculated or not calculated based on the result of the calculations in an earlier portion of the pipeline. In such embodiments, the calculated least significant bit portion of the mantissa product may be added to, otherwise combined with, or otherwise used to correct or adjust the previous mantissa product previously calculated at block 454.

Alternatively, if the determination is that the uncalculated least significant bit portion of the mantissa product could not possibly have affected the final multiply-add result (i.e., "no" is the determination at block 455), the method may advance to block 457. At block 457, the product of the floating point multiplier and multiplicand data elements (e.g., based on the mantissa product and also a sum of exponents) may be added to the floating point addend data element, and a final multiply-add result may be stored or otherwise provided.

It is believed that in many, or even most cases, the determination at block 455 may be used to verify, guarantee, or ensure that the uncalculated least significant bit portion cannot possibly affect the final multiply-add result. In such cases, the energy savings due to not calculating it was beneficial. Conversely, the determination at block 455 may be used to detect those (e.g., generally rarer) instances where, based on the particular approach or technique used for the determination, either the uncalculated least significant bit portion may affect the final multiply-add result, or it cannot be guaranteed that it will not affect the final multiply-add result. In such cases, a corrective action may be performed to ensure that the final multiply-add result is correct.

Figure 5:
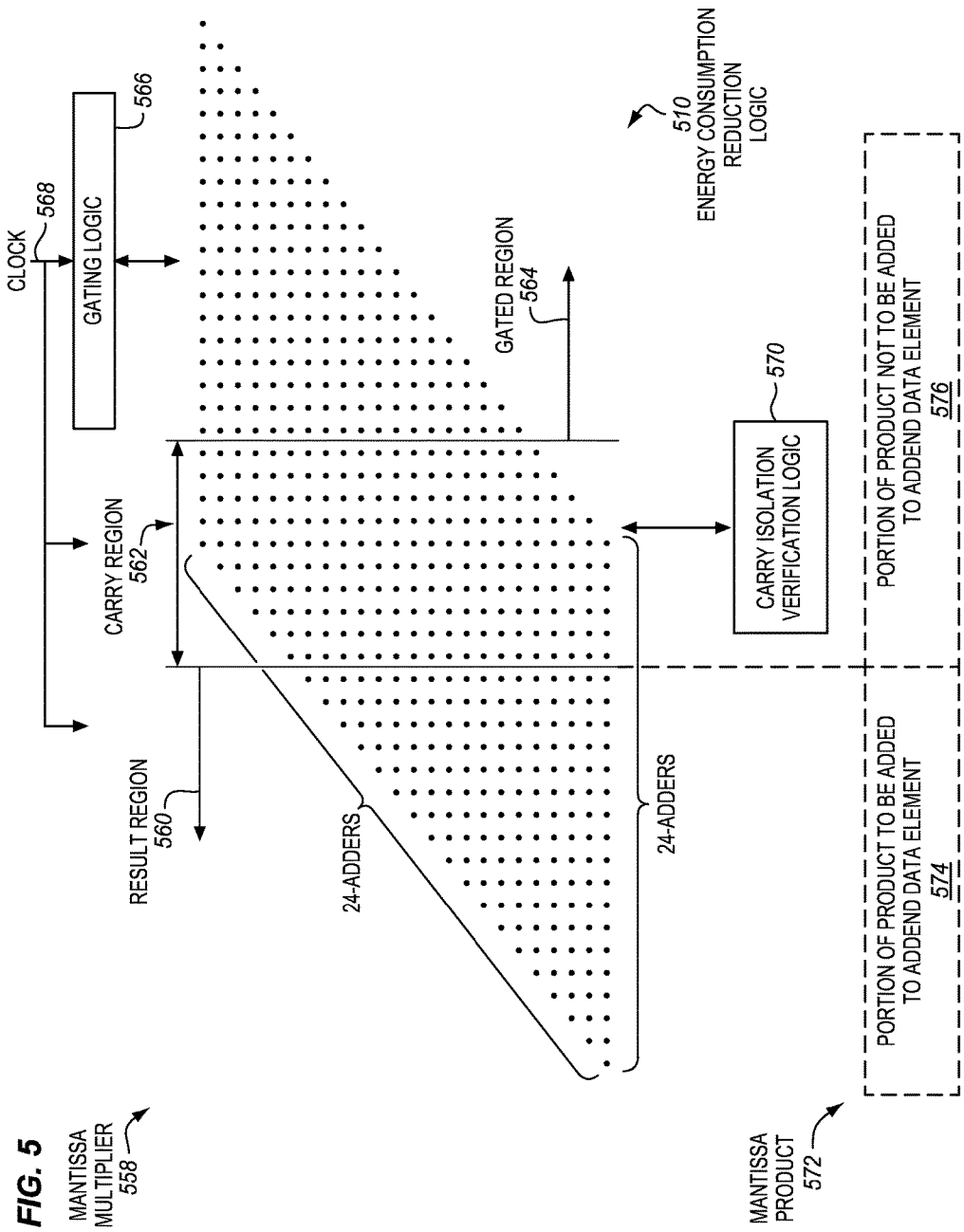
FIG. 5 is a block diagram of an example embodiment of a mantissa multiplier that includes energy consumption reduction logic.

FIG. 5 is a block diagram of an example embodiment of a mantissa multiplier 558 that includes energy consumption reduction logic 510. In some embodiments, the mantissa multiplier may optionally be included in the floating point multiply-add units of FIG. 1 and/or FIG. 3. Alternatively, the mantissa multiplier may optionally be included in a similar or different floating point multiply-add unit or processor. Also, the floating point multiply-add units of FIG. 1 and/or FIG. 3 may include a mantissa multiplier that is the same, similar, or different than the mantissa multiplier 558. Moreover, in some embodiments, the mantissa multiplier 558 may be used to perform the method 452 of FIG. 4 (e.g., blocks 454, 455, and 456). The components, features, and specific optional details described for the mantissa multiplier 558 may also optionally apply to the method 452. Alternatively, the method 452 may be performed with a similar or different mantissa multiplier.

The particular illustrated multiplier 558 is a 24-bit by 24-bit multiplier, which is suitable for multiplying two 24-bit mantissas of two 32-bit single precision floating point numbers, although the scope of the invention is not so limited. The multiplier is depicted as a parallelogram of dots in which there are twenty-four dots on each dimension or side of the parallelogram. Analogous larger or smaller multipliers are also suitable for multiplying other sized mantissas corresponding to other types of floating point numbers (e.g., those shown and described for FIGS. 2A-2D). For example, an analogous 53-bit by 53-bit multiplier is contemplated for multiplying two 53-bit mantissas of two 64-bit double precision floating point numbers.

Each dot in the parallelogram may represent an adder, with carries pushed from the right to the left (as viewed). In some embodiments, each adder may represent a 3-2 full carry-save adder (CSA) that has three inputs: (1) the logical AND of a pair of the input bits; (2) the save of the 3-2 CSA above it (as viewed); and (3) the carry from the 3-2 CSA above and to the right of it (as viewed). Similarly, each 3-2 CSA may have two outputs: (1) a save that is provided to the 3-2 CSA below it (as viewed); and (2) the carry that is provided to the 3-2 CSA below and to the left of it (as viewed). The carry term may go down a row, and to the next column, and meet up with the sum term coming down from that column. In this way, the addition of values may propagate down the columns. Work may propagate down and then across. The last row may combine the remaining carries and sum terms to produce the mantissa product. It is to be appreciated that this is just one illustrative embodiment of a suitable multiplier. Other multiplier types and designs are also suitable, such as, for example, Booth encoded multipliers, and may also utilize the energy consumption reduction logic and approaches described herein for a portion of the multiplier used to calculate the least significant bits of the mantissa product.

In some embodiments, the multiplier may be logically partitioned into three different regions or other portions, which in the illustration are labeled a result region 560, a carry region 562, and a gated region 564. In the illustration, these different regions or portions are demarcated by vertical lines. These regions or portions may include different subsets of adders and/or other circuitry and/or other logic of the multiplier. The particular illustrated location of the vertical lines is not required, and may vary, as will be explained further below (e.g., depending upon the exponent of the addend as compared to the sum of the exponents of the multiplier and multiplicand).

In some embodiments, the result region 560 may correspond to and broadly represent a most significant bit portion of the multiplier and/or a most significant bit portion 574 of the mantissa product 572. In some embodiments, the most significant bit portion 574 may represent that portion of the mantissa product that is to be added to the addend data element (e.g., after any shift due to the relative exponents). The most significant bit portion may be relatively smaller when the addend exponent is relatively larger than the sum of the exponents of the multiplier and mantissa, or relatively larger otherwise. In other words, the result region rightmost boundary may shift right or left depending upon the relative shifts due to the relative exponents of the floating point numbers. In some embodiments, the carry region 562 may correspond to and broadly represent an intermediate bit portion of the multiplier and/or an intermediate significant bit portion of the mantissa product 572 that is in a portion 576 of the mantissa product that is not to be added to the addend data element. In some embodiments, the gated region 564 may correspond to and broadly represent a least significant bit portion of the multiplier and/or a least significant bit portion of the mantissa product 572 that is in the portion 576 of the mantissa product that is not to be added to the addend data element.

In some embodiments, the gated region 564 may represent a subset of logic or other portion of the multiplier that, in cases where it can be ensured or guaranteed that the final multiply-add result does not depend on its value, may be gated and/or its power consumption may be reduced. In addition, in some embodiments, the size of the gated region and/or the amount of power consumption that may be achieved may be greater when the addend floating point number (e.g., its exponent) is larger and/or less bits of the mantissa product affect the final multiply-add result. As shown, gating logic 566 of the energy consumption reduction logic 510 may be coupled with the gated region, and may be operative to gate (e.g., clock and/or data gate), or not gate, the gated region. The gating logic may be implemented in hardware and/or firmware. Generally the larger the gated region the more energy can be saved when gated.

Different ways of gating the gated region 564 may be used in different embodiments. In some embodiments, the gating of the gated region may include clock gating the gated region. For example, a clock signal 568 may, or may not, be selectively applied to the gated region, while being applied to the result region 560 and the carry region 562. In some embodiments, the gating of the gated region may include data gating or logical gating the gated region, in which the same data values or inputs from the previous cycle may be latched to all of the inputs to the logic in the gated region, in order to keep the internal nodes from toggling. By not toggling the internal nodes no active power may be consumed, although some leakage current or power may still be incurred. In some embodiments, all of the carries in the gated region (e.g., to the right of the rightmost vertical line as viewed) may optionally be replaced with hard-wired zeroes. In some embodiments, pipestage latches in the gated region may optionally be clock gated. Other ways of selectively reducing power to and/or energy consumption the gated region and/or shutting down calculations in the gated region are also contemplated. For example, power gating may optionally be used if able to be applied and de-applied rapidly enough.

Carry isolation verification logic 570, of the energy consumption reduction logic 510, may be coupled with the carry region 562. The carry isolation verification logic may be implemented in hardware and/or firmware. The carry isolation verification logic may be operative to determine whether the gated region could possibly affect the final multiply-add result (e.g., which is based on the value of the addend exponent and/or the relative radix point shift amount), or if the carries of the gated region are guaranteed to be isolated from the result region by the intervening carry region. This determination may be made in different ways in different embodiments. To further illustrate certain concepts, a few representative approaches will be discussed further below, although other approaches are also contemplated, and will be apparent to those skilled in the art having the benefit of the present disclosure.

According to one possible approach, in some embodiments, the carry isolation verification logic 570 may be operative to determine whether or not the maximum possible carry that could emanate from the gated region 564 could possibly ripple or propagate all the way across the carry region 562, based on the value actually calculated for the carry region, and into the result region 560. In some embodiments, the maximum possible carry from an n-bit wide gated region may be estimated as (n−1). For example, the maximum possible carry from an 8-bit wide gated region may be estimated as 7, from a 5-bit wide gated region may be estimated as 4, and so on. So, if based on this (n−1) estimate of the maximum possible carry from the n-bit wide gated region, and the actual calculated value for the carry region, it is determined that a carry could possibly ripple or propagate all the way across the carry region, and into the result region, then it cannot be guaranteed, verified, or ensured that the final result could not possibly have been affected by the gated region. In such cases, corrective action may be performed (e.g., the gated region may be calculated or the entire calculation performed again but without gating the gated region).

Alternatively, if based on this (n−1) estimate of the maximum possible carry from the n-bit wide gated region, and the actual calculated value for the carry region, a carry could not possibly have rippled or propagated all the way across the carry region, and into the result region, then it can be guaranteed, verified, or ensured that the final result could not possibly have been affected by the gated region (whatever might have happened there). In such cases, the gated region did not need to be calculated, and power and/or energy savings has been wisely achieved by not calculating it.

The (n−1) estimate of the maximum possible carry from the n-bit wide gated region generally tends to be a relatively good estimate when the n-bit wide gated region is smaller than the number of bits in the mantissa, and the n-bit wide gated region resides fully or at least primarily in the least significant bit portion of the multiplier corresponding to the upward slanted rightmost edge (as viewed) of the parallelogram. In cases where the gated region extends to the left of this slanted region, such an estimate still conservatively estimates the maximum possible carry, even when the size of the gated region is larger than the number of bits in the mantissa, and so may optionally be used as a limit for the maximum possible carry. However, in such cases this estimate may tend to provide a somewhat higher than optimal false-positive rate or likelihood of performing a corrective action when it turns out not to be really necessary. As an alternatively, if desired, other approaches may optionally be used to reduce the false-positive rate in such cases. In some embodiments, the carry isolation verification logic may include logic to implement such a decision based on the known width of the gated region, and the calculated value of the carry region, in order to determine whether or not a corrective action should be taken. By way of example, for each of one or more supported bit widths of the gated region, a maximum value allowed for the carry region may be stored in a lookup table of the carry isolation verification logic, hardwired into the carry isolation verification logic, or the like.

Also, the (n−1) estimate of the maximum possible carry generally calculates over conservatively. If desired, more power savings can potentially be achieved by refining the estimate. The (n−1) estimate assumes all ones in the portions of the multiplier and multiplicand mantissas that correspond to the gated region. A more accurate estimate may be achieved by taking into account the number of zeroes in the portions of the multiplier and multiplicand mantissas that correspond to the gated region. For example, in some embodiments, a count of leading zeroes may be used to reduce the maximum possible carry out. For example, if zmc represents the count of zeros in the portion of the multiplicand mantissa corresponding to the gated region, and zmp represents the count of zeros in the portion of the multiplier mantissa corresponding to the gated region, max carry out of the gated region is the maximum of (zmp and zmc) less one. Accordingly, a more detailed estimate of the maximum carry from the gated region may be estimated as (n−1)−(max(zmp, zmc)−1).

According to yet another possible approach, in some embodiments, the carry isolation verification logic 570 may be operative to determine whether or not an appropriate number of most significant bits in the carry region are all set to binary one. In some embodiments, the number of most significant bits may be equal to, or optionally one or more bits more than, the number calculated by (k−m−log 2(2n−k)). In this expression, the variable k may represent the position of the adder of the multiplier, as measured from the most significant position, of the boundary between the carry region and the gated region (e.g., 28 in FIG. 5), the variable m may represent the position of the adder of the multiplier, as measured from the most significant position, of the boundary between the result region and the carry region (e.g., 18 in FIG. 5), and the variable n represents the number of bits of the mantissa (e.g., 24 in this example). If at least this number of bits are all set, then it may not be verifiable that the carry does not propagate, whereas if one or more of the bits are not set then it may be verified that the carry would not propagate. Such an approach may have a somewhat slightly higher than optimal false-positive rate, but may tend to allow for an efficient logic implementation (e.g., a relatively small and/or low power consumption circuit or other logic may be used to check these bits and make this determination).

Different ways are possible for dealing with the situations where the gated region needs to be calculated. As previously mentioned, in some embodiments, the logic may be designed so that the entire mantissa product, including the gated region (i.e., without gating it), may optionally be fully calculated. For example, the prior calculation results may be flushed or discarded from the pipeline, and the entire calculation may be restarted in the pipeline from the beginning this time include the gated region in the calculation. Such an approach may tend to have relatively low latency for the situations where the gated region is not needed, but relatively high latency or penalty of a full pipeline replay when the gated region is needed. In other embodiments, a longer pipeline may optionally be employed. An initial portion of the pipeline may be used to calculate the carry region. Based on the results of the calculations in this initial portion of the pipeline for the carry region, a determination may be made whether the gated region is needed. A subsequent portion of the pipeline may be used to calculate the gated region as well as the result region. The gated region portion of the subsequent portion of the pipeline may be gated or not gated depending upon how the calculations turn out in the initial portion of the pipeline. When the gated region is not gated, it may be combined with the calculations performed in the initial portion of the pipeline. Due to including the initial pipeline stage check of the carry region, the latency may be substantially the same whether or not the gated region is gated.

Figure 6:
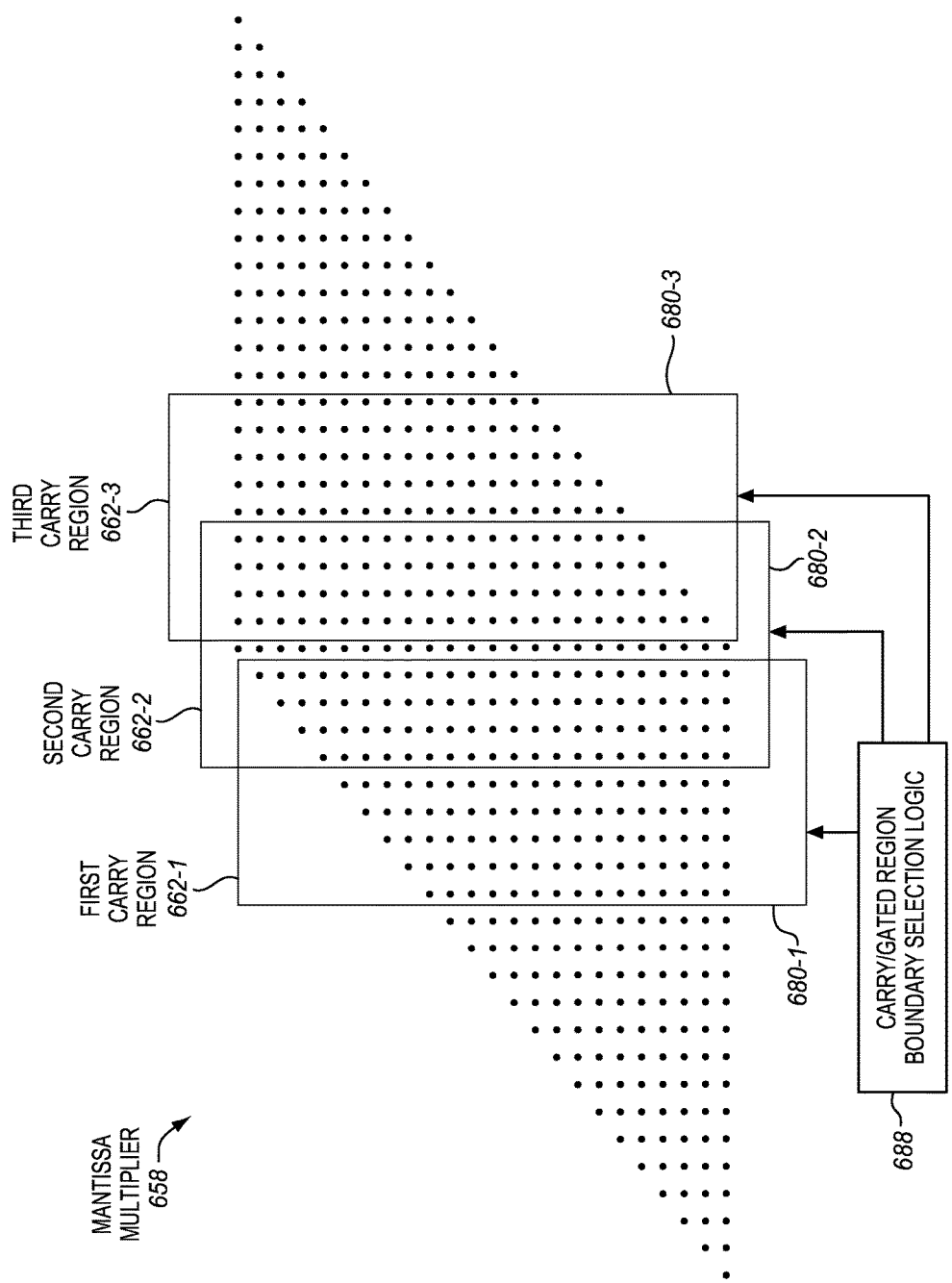
FIG. 6 is a block diagram of an example embodiment of a mantissa multiplier that has at least two different possible locations for a carry boundary between a carry region and a gated region.

FIG. 6 is a block diagram of an example embodiment of a mantissa multiplier 658 that has at least two different possible locations for a carry/gated region boundary 680. In some embodiments, the mantissa multiplier may optionally be included in the floating point multiply-add units of FIG. 1 and/or FIG. 3. Alternatively, the mantissa multiplier may optionally be included in a similar or different floating point multiply-add unit or processor. Also, the floating point multiply-add units of FIG. 1 and/or FIG. 3 may include a mantissa multiplier that is the same, similar, or different than the mantissa multiplier 558. Moreover, in some embodiments, the mantissa multiplier 558 may be used to perform the method 452 of FIG. 4 (e.g., blocks 454, 455, and 456). The components, features, and specific optional details described for the mantissa multiplier 558 may also optionally apply to the method 452. Alternatively, the method 452 may be performed with a similar or different mantissa multiplier. Also, the multiplier 658 of FIG. 6 has certain similarities to the multiplier 558 of FIG. 5. To avoid obscuring the description, the different and/or additional characteristics for the multiplier 658 will primarily be described, without repeating all the optionally similar or common characteristics and details relative to the multiplier 558. However, it is to be appreciated that the previously described characteristics and details of the multiplier 558 may also optionally apply to the multiplier 658, unless stated otherwise or otherwise clearly apparent.

In multiply-accumulate and other multiply-add operations, the magnitude of the addend data element (e.g., the value of its exponent) may vary from one multiply-add operation to another. These varying exponents of the addend data element may result in varying relative shift amounts or alignment being applied to the mantissa product. For example, if the sum of the exponents of the multiplier and multiplicand data elements is four, and the exponent of the addend data element is six, then a shift of two radix positions may be used to achieve radix point alignment. However, if the sum of the exponents of the multiplier and multiplicand data elements is four, and the exponent of the addend data element is ten, then a shift of six radix positions may be used to achieve radix point alignment. To be precise, the addition of the exponents of the multiplicand and the multiplier gives you a resulting exponent of the multiply that is within one of the actual value. It is not always exactly the sum of the exponents, but in some cases could be the sum of the exponents plus one. For example, the value "111" times "111" is "110001" with the most significant bit position of 5 and not the exact sum of exponents 4 (i.e., 2+2). In any event, such varying shift amounts may make it beneficial to have two or more different possible locations for the boundary between the carry and gated regions. For example, this may allow different amounts of energy reduction based on different numbers of bits of the mantissa product that can affect the final multiply-add result and that need to be calculated. For example, when less mantissa product bits are needed, the gated region may be made relatively larger so that more power savings can be achieved, or when more mantissa product bits are needed, the gated region may be made relatively smaller in which less power savings can be achieved. In some embodiments, mantissa multiplier energy consumption reduction logic may include a carry/gated region boundary selection logic 688 to select one of two or more supported different possible locations for the carry/gated region boundary.

In the illustrated example embodiment, a first possible carry/gated region boundary 680-1, a second possible carry/gated region boundary 680-2, and a third possible carry/gated region boundary 680-3 are show. As shown, in some embodiments, the different possible locations 680 may span a significant proportion of the overall span of the multiplier, which may help to realize a relatively wide range of different amounts of possible energy consumption reduction, although this is not required. In other embodiments, fewer or more possible locations of the carry/gated region boundary may instead optionally be used. In some embodiments, a completely flexible carry/gated region boundary may optionally be supported that can be placed at any possible location (e.g., based on the particular floating point number inputs, the desired likelihood of a false positive, etc.). However, often it may be beneficial instead to support two, three, or more (e.g., but often less than about eight) fixed positions for the carry boundary, in order to capture much of the benefit of being able to have different levels of energy savings without needing as much logic as may be used to support a completely flexible carry/gated region boundary. However, either approach is possible. In the illustrated example, the widths of each of the carry regions is the same, although it is also possible and contemplated that it may be beneficial to change the width of the carry region as the position of the carry/gated region boundary changes (e.g., to adjust the likelihood of false positives).

Figure 7:
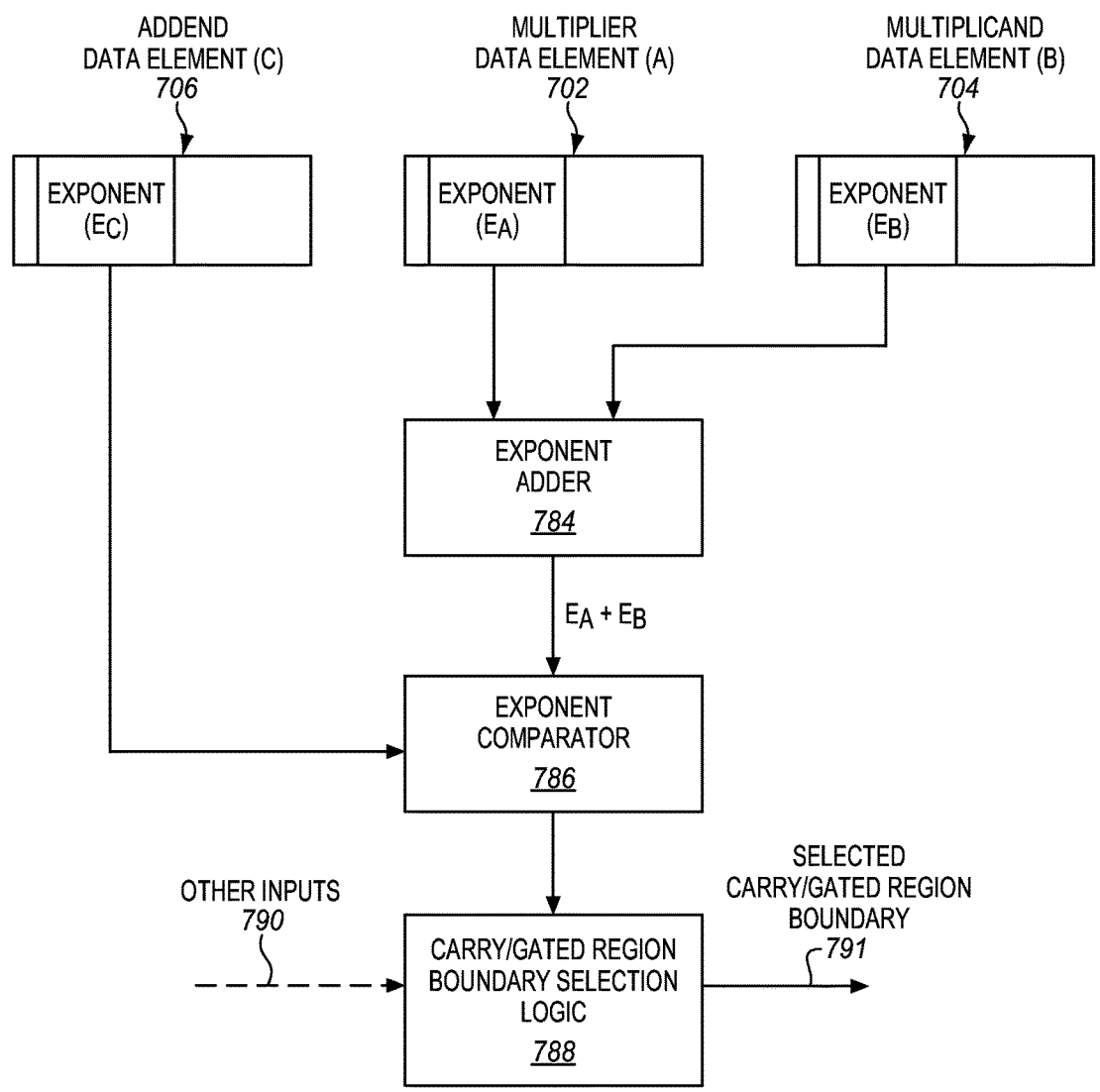
FIG. 7 is a block diagram of an example embodiment of carry boundary selection logic.

FIG. 7 is a block diagram of an example embodiment of carry/gated boundary selection logic 788 that is operable to select one of multiple possible carry/gated region boundaries based at least in part on an exponent ($E_C$) of an addend data element (C) 706. An exponent ($E_A$) 702 of the multiplier data element (A), and an exponent ($E_B$) 704 of the multiplicand data element (B), may each be provided to an exponent adder 784. A sum of these exponents ($E_A+E_B$) may be provided to an exponent comparator 786. The exponent ($E_C$) of the addend data element (C) may also be provided to the exponent comparator. The exponent comparator may be operative to subtract or otherwise compare these input values, and provide a corresponding output (e.g., a difference between these values, a relative shift to align the radix points of the mantissa product and the addend data element, etc.) to the carry boundary selection logic 788. In some embodiments may be done relatively soon (e.g., in the first cycle or two) after receiving the operands at the floating point multiply-add unit. The carry boundary selection logic may be operative to output a selection of a carry boundary 791 based on this input and optionally other input 790. Possible examples of other input include, but are not limited to, a configured or specified energy consumption reduction level or goal, a configured or specified likelihood for a false positive corrective adjustment when one was not really needed, input from a power management system or software, thermal data, a turbo mode of the processor, or the like. In some embodiments, the selection of the carry/gated region boundary 791 may be output to gating logic (e.g., the gating logic 566) to allow the gating logic to gate an implicated flexible portion of a mantissa multiplier.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU;

3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
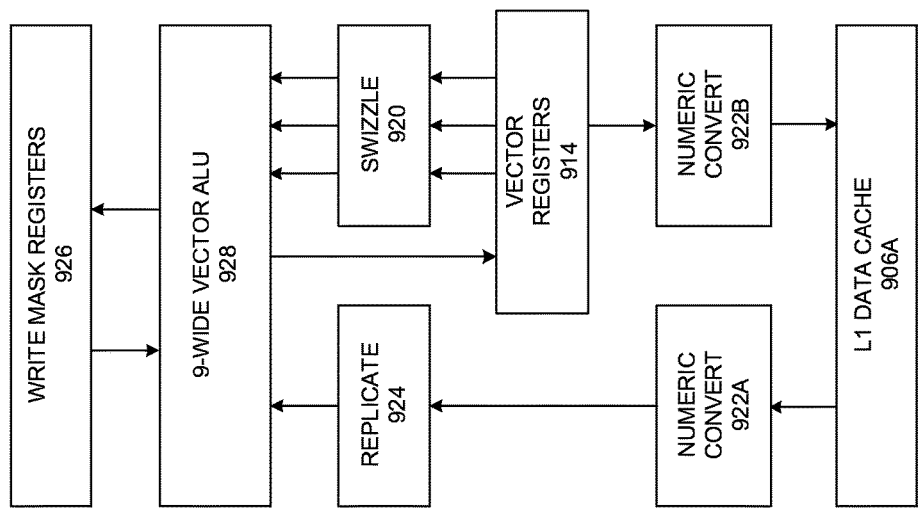
FIG. 9B is a block diagram of an embodiment of an expanded view of part of the processor core of FIG. 9A.
Figure 9A:
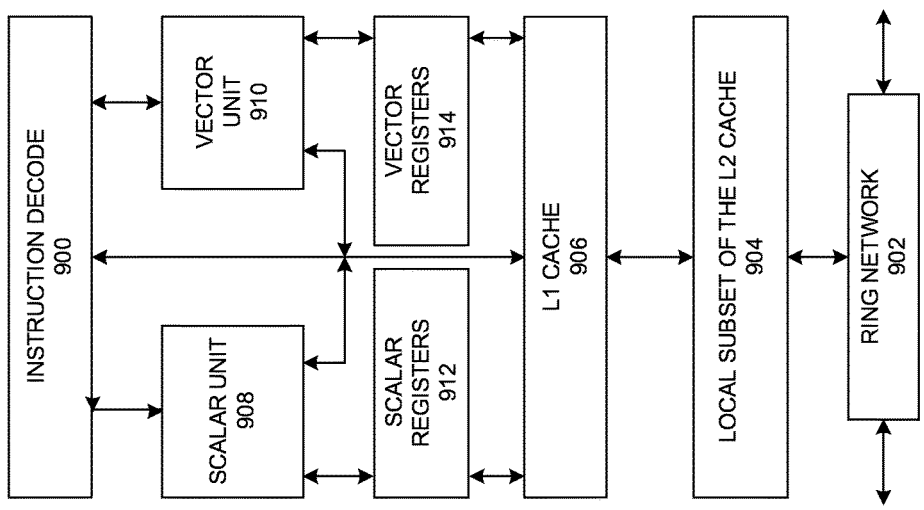
FIG. 9A is a block diagram of an embodiment of a single processor core, along with its connection to the on-die interconnect network, and with its local subset of the Level 2 (L2) cache.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 1912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
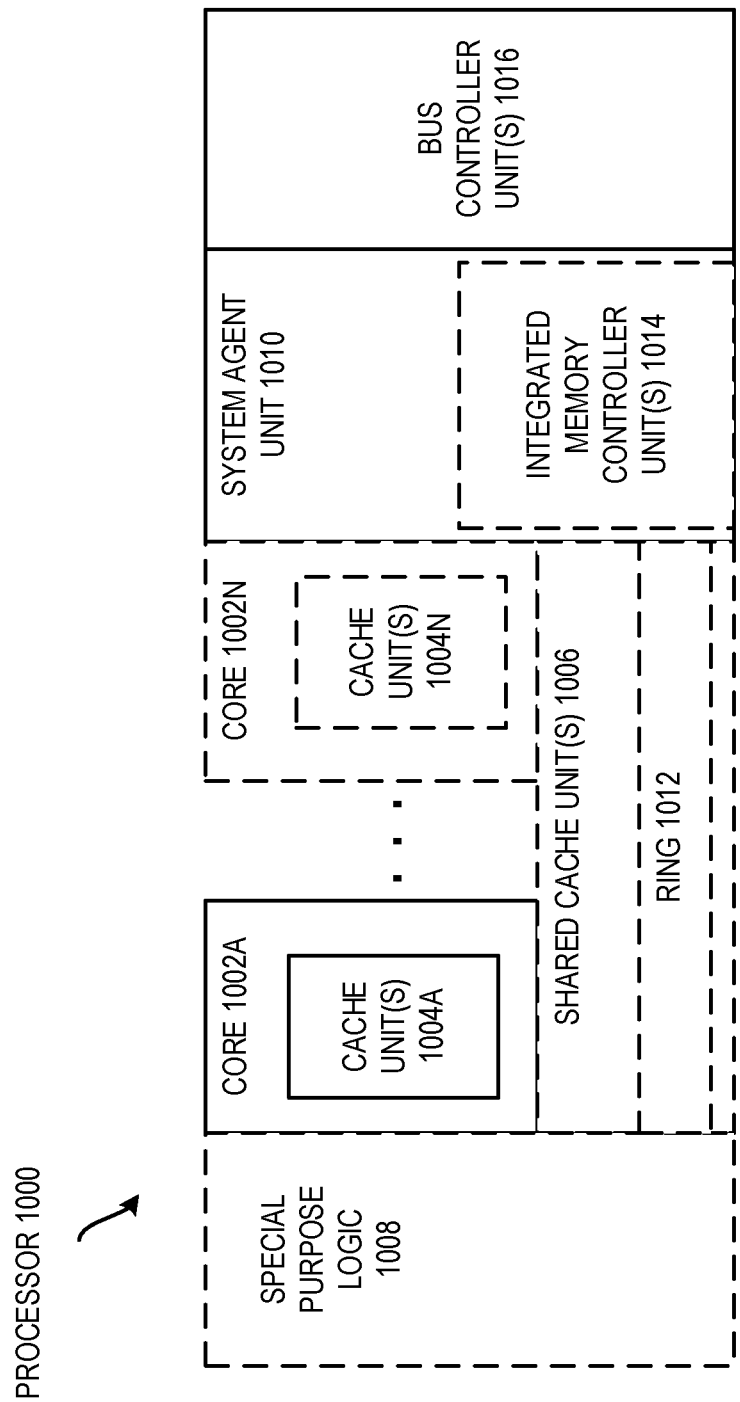
FIG. 10 is a block diagram of an embodiment of a processor that may have more than one core, may have an integrated memory controller, and may have integrated graphics.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
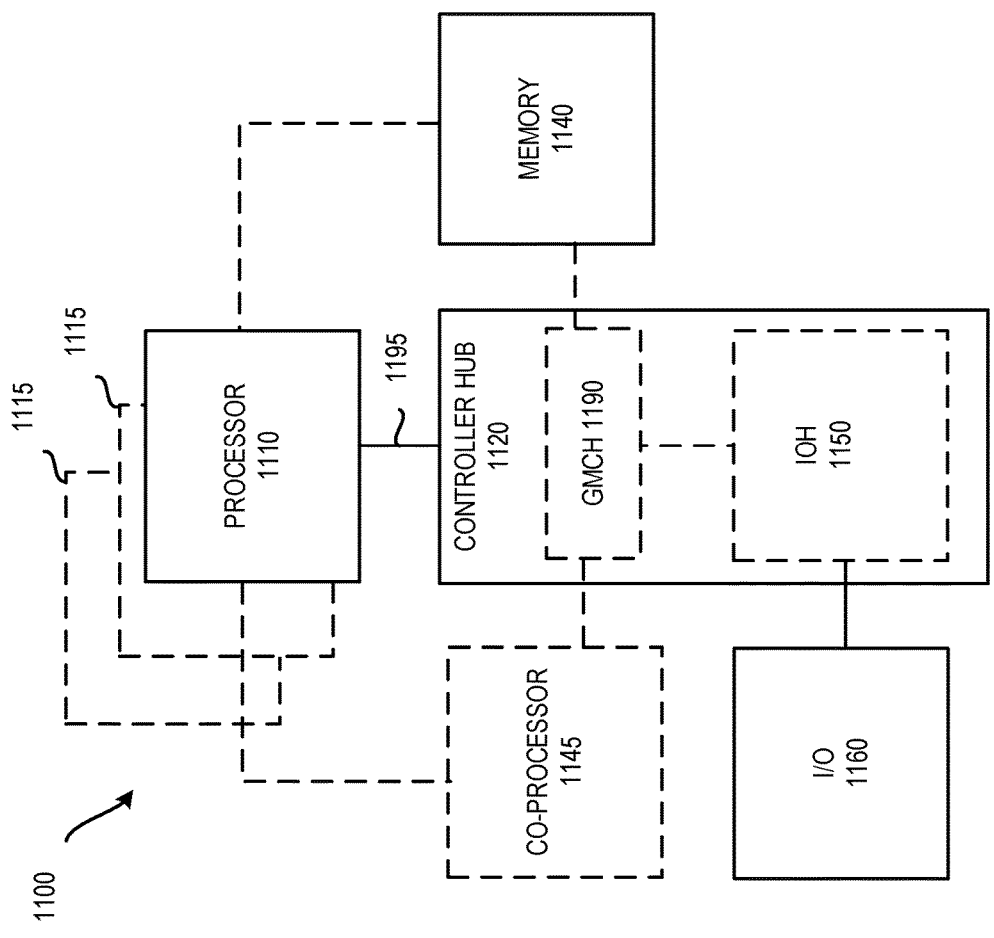
FIG. 11 is a block diagram of a first embodiment of a computer architecture.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
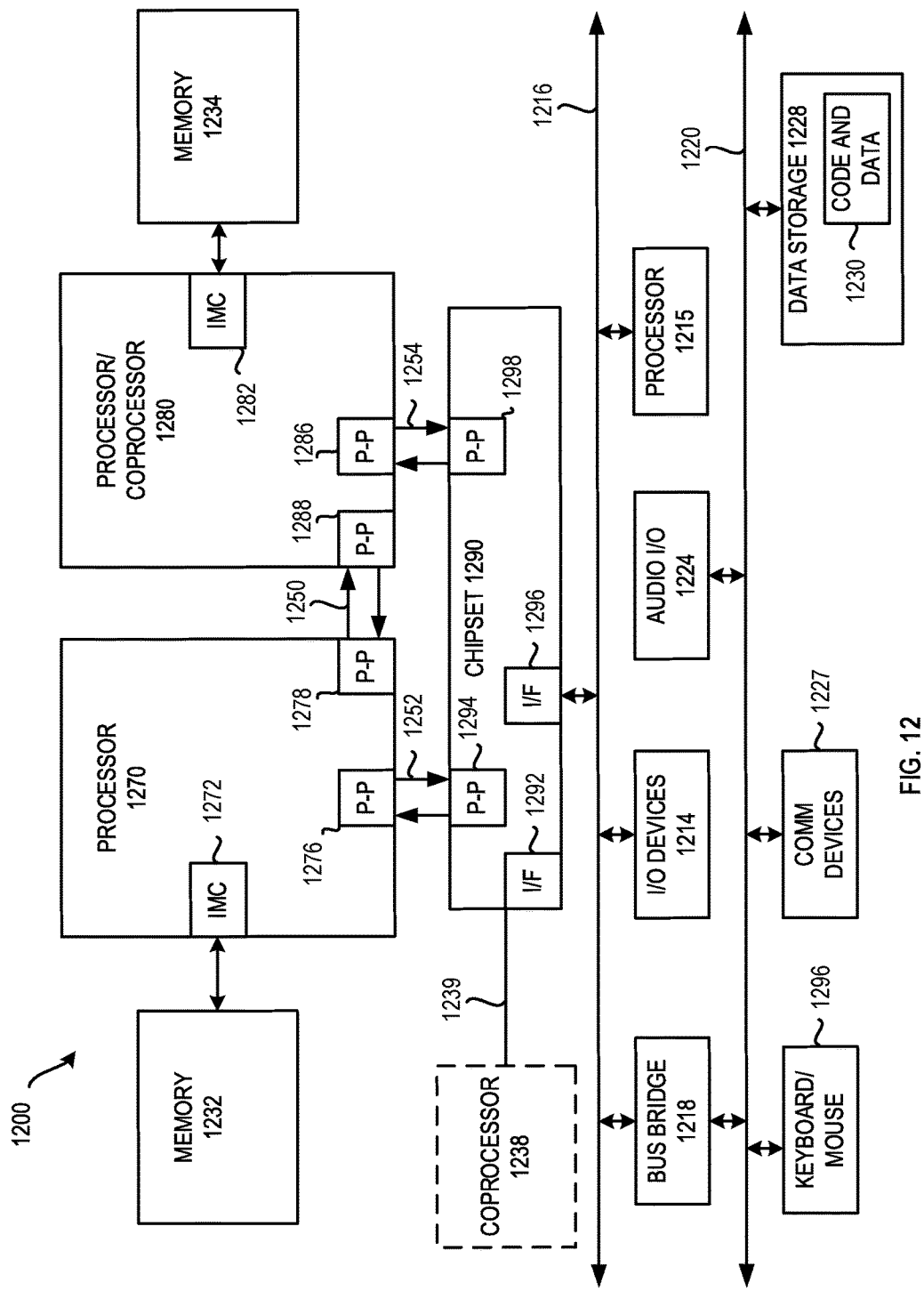
FIG. 12 is a block diagram of a second embodiment of a computer architecture.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPG-PU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
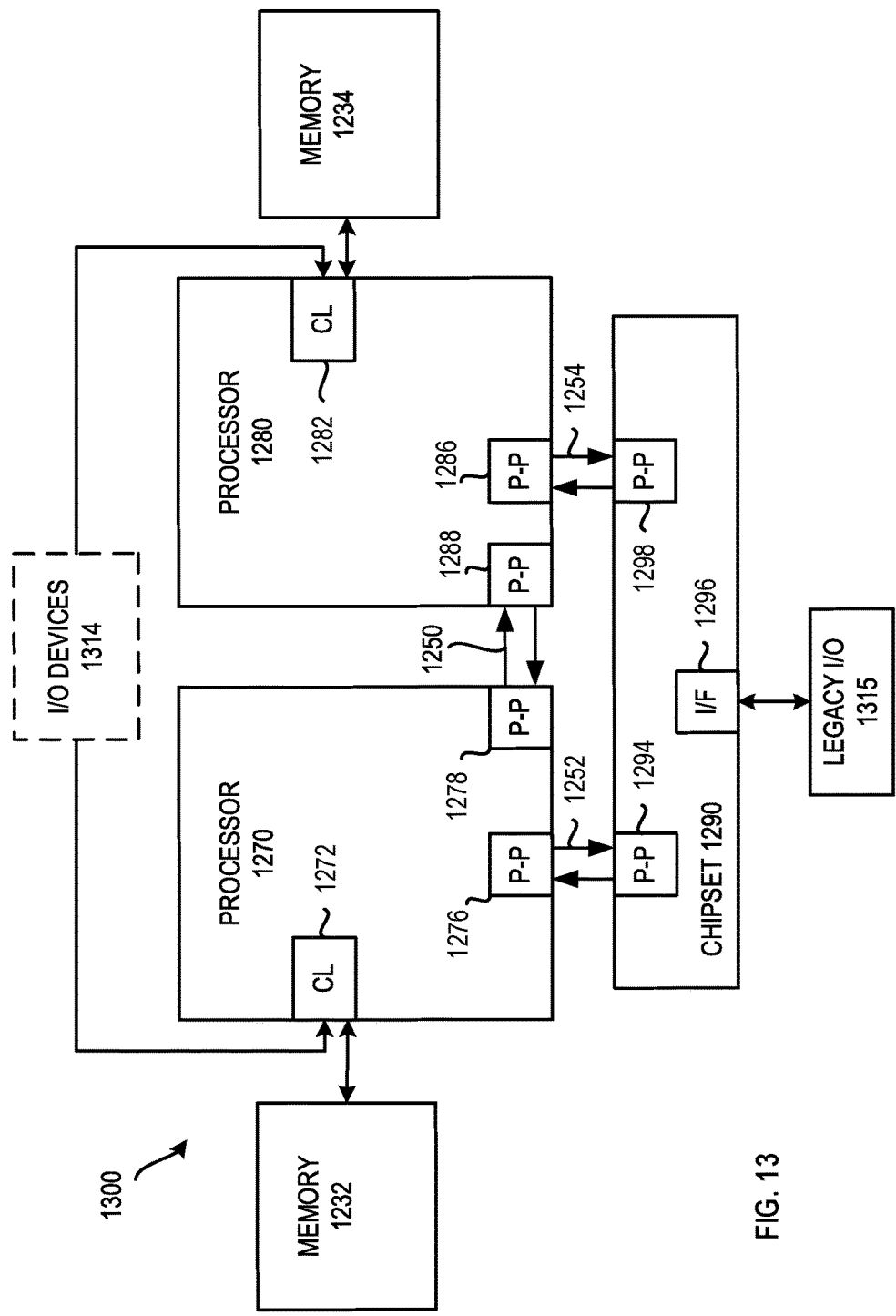
FIG. 13 is a block diagram of a third embodiment of a computer architecture.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
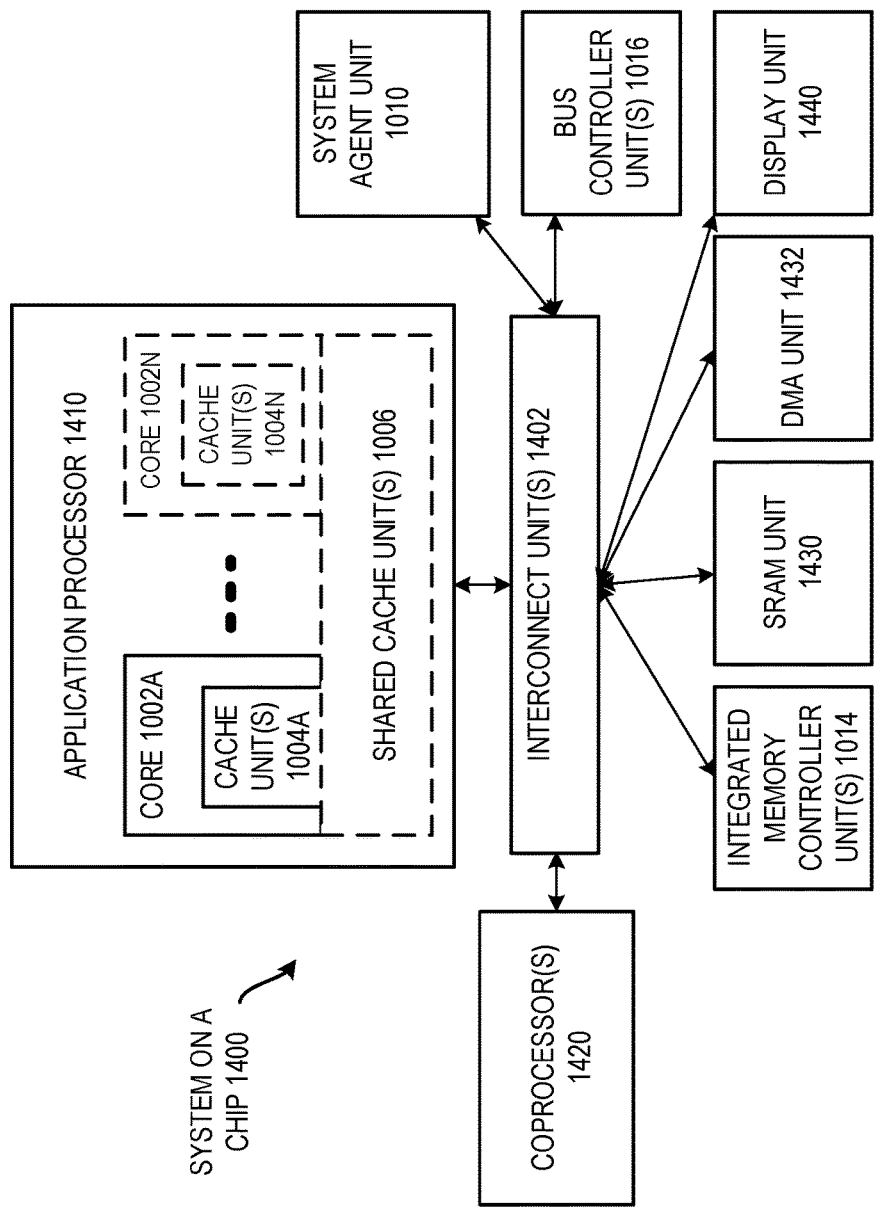
FIG. 14 is a block diagram of a fourth embodiment of a computer architecture.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 132A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
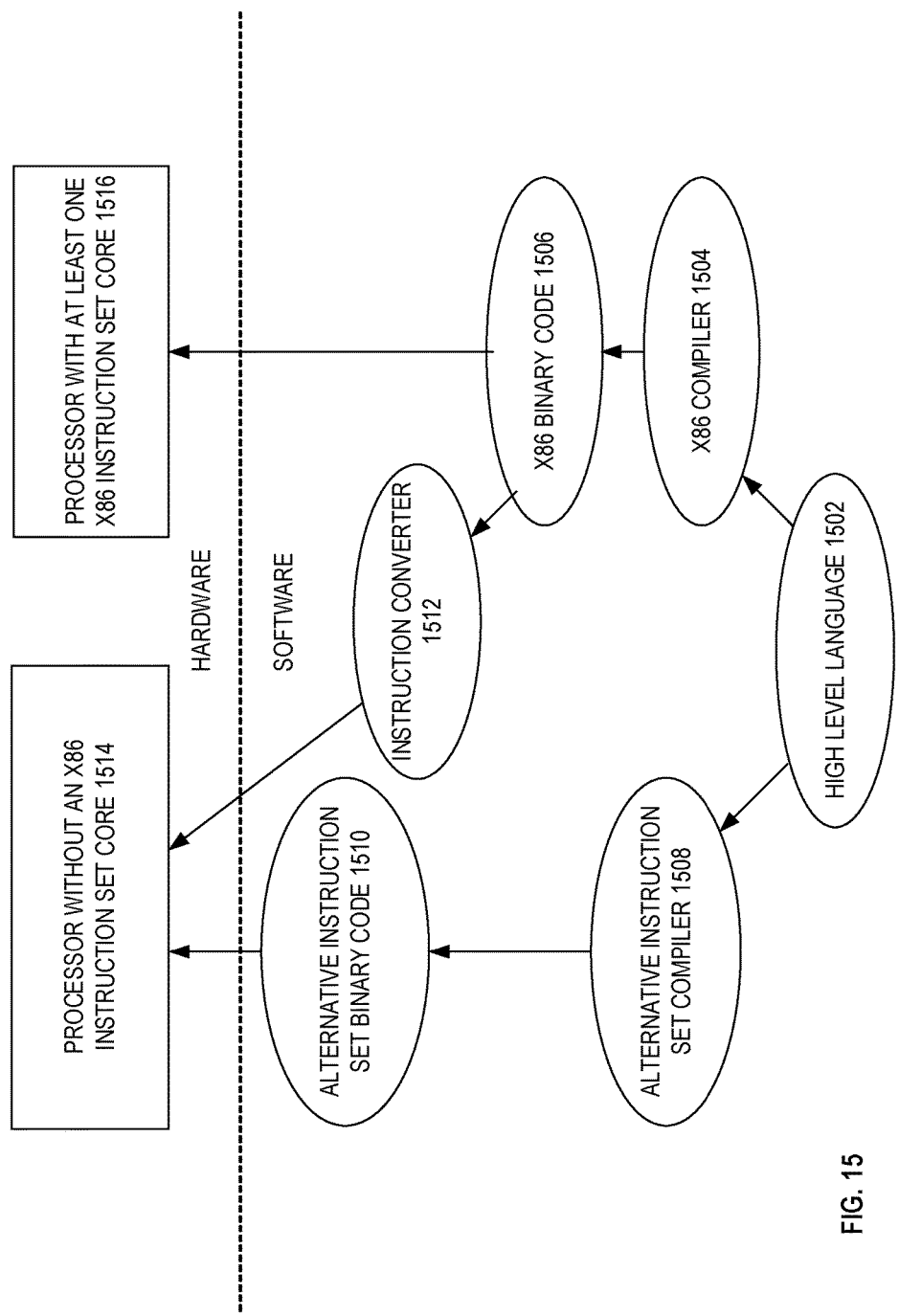
FIG. 15 is a block diagram of use of a software instruction converter to convert binary instructions in a source instruction set to binary instructions in a target instruction set, according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Components, features, and details described for any of the floating point multiply adders and/or multipliers disclosed herein may optionally apply to any of the methods disclosed herein, which in embodiments may optionally be performed by and/or with such processors. Any of the processors described herein in embodiments may optionally be included in any of the systems disclosed herein (e.g., any of the systems of FIGS. 11-14).

Processor components disclosed herein may be said to be operative, configured, capable, or able to perform an operation. For clarity, it is to be understood that these expressions do not imply that the processor components are in operation or use, but rather refer to what the processor components are capable of doing or able to do when they are in operation, but in the apparatus claims these processor components are not in operation.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a floating point multiply-add unit having inputs coupled to receive a floating point multiplier data element, a floating point multiplicand data element, and a floating point addend data element. The floating point multiply-add unit includes a mantissa multiplier to multiply a mantissa of the floating point multiplier data element and a mantissa of the floating point multiplicand data element to calculate a mantissa product. The mantissa multiplier includes a most significant bit portion to calculate most significant bits of the mantissa product, and a least significant bit portion to calculate least significant bits of the mantissa product. The mantissa multiplier has a plurality of different possible sizes of the least significant bit portion. Energy consumption reduction logic is included to selectively reduce energy consumption of the least significant bit portion, but not the most significant bit portion, to cause the least significant bit portion to not calculate the least significant bits of the mantissa product.

Example 2 includes the processor of Example 1, further including logic to select one of the plurality of different possible sizes of the least significant bit portion based, at least in part, on the floating point addend data element.

Example 3 includes the processor of Example 2, in which the logic is to select the one size based, at least in part, on an exponent of the floating point addend data element.

Example 4 includes the processor of Example 3, in which the logic is to select the one size based, at least in part, on the exponent of the floating point addend data element, and a sum of an exponent of the floating point multiplier data element and an exponent of the floating point multiplicand data element.

Example 5 includes the processor of any one of Examples 1 to 4, in which the mantissa multiplier further includes an intermediate portion, which is coupled between the most and least significant bit portions, to calculate intermediate bits of the mantissa product that are to be between the most significant bits and the least significant bits.

Example 6 includes the processor of Example 5, in which the energy consumption reduction logic includes logic to determine, based on the intermediate bits, whether the least significant bits could have affected the most significant bits of the mantissa product.

Example 7 includes the processor of any one of Examples 5 to 6, in which the intermediate portion is in an initial portion of a pipeline and the least significant bit portion is in a subsequent portion of the pipeline.

Example 8 includes the processor of any one of Examples 5 to 6, in which the intermediate portion and the least significant bit portion are in a same portion of the pipeline.

Example 9 includes the processor of any one of Examples 1 to 8, in which the most significant bit portion is to calculate all most significant bits of the mantissa product that are to be added to a mantissa of the floating point addend data element.

Example 10 includes the processor of any one of Examples 1 to 9, in which the energy consumption reduction logic includes clock gate logic, which is coupled to the least significant bit portion, to selectively gate a clock signal to the least significant bit portion, but not the most significant bit portion.

Example 11 includes the processor of any one of Examples 1 to 10, in which the mantissa multiplier has at least three different possible sizes of the least significant bit portion.

Example 12 includes the processor of any one of Examples 1 to 11, in which the mantissa multiplier includes a 53-bit by 53-bit multiplier.

Example 13 includes the processor of any one of Examples 1 to 11, in which the mantissa multiplier includes a 24-bit by 24-bit multiplier.

Example 14 includes the processor of any one of Examples 1 to 11, in which the mantissa multiplier includes a 11-bit by 11-bit multiplier.

Example 15 is a method in a processor that includes starting a floating point multiply-add operation on a floating point multiplier data element, a floating point multiplicand data element, and a floating point addend data element. The method also includes multiplying a mantissa of the floating point multiplier data element and a mantissa of the floating point multiplicand data element to calculate a mantissa product, without calculating a least significant bit portion of the mantissa product that has a size that is based, at least in part, on the floating point addend data element.

Example 16 includes the method of Example 15, further including selecting the size based, at least in part, on an exponent of the floating point addend data element, and a sum of an exponent of the floating point multiplier data element and an exponent of the floating point multiplicand data element.

Example 17 includes the method of any one of Examples 15 to 16, further including selecting the size from a plurality of different possible sizes based, at least in part, on the floating point addend data element.

Example 18 includes the method of any one of Examples 15 to 17, further including calculating an intermediate portion of the mantissa product between the least significant bit portion of the mantissa product and a most significant bit portion of the mantissa product, and determining based on the intermediate portion whether least significant bit portion of the mantissa product could have affected the most significant bit portion of the mantissa product.

Example 19 includes the method of any one of Examples 15 to 18, further including selectively reducing energy consumption of a portion of a mantissa multiplier that corresponds to the least significant portion of the mantissa product, without reducing energy consumption of a portion of the mantissa multiplier that corresponds to a most significant portion of the mantissa product.

Example 20 includes the method of Example 19, in which said selectively reducing the energy consumption includes clock gating the portion of the mantissa multiplier that corresponds to the least significant portion of the mantissa product.

Example 21 is a computer system that includes a bus or other interconnect, a memory coupled with the interconnect, and a processor coupled with the interconnect. The processor includes a floating point multiply-add unit having inputs coupled to receive a floating point multiplier data element, a floating point multiplicand data element, and a floating point addend data element. The floating point multiply-add unit includes a mantissa multiplier to multiply a mantissa of the floating point multiplier data element and a mantissa of the floating point multiplicand data element to calculate a mantissa product. The mantissa multiplier includes a most significant bit portion to calculate most significant bits of the mantissa product, a least significant bit portion to calculate least significant bits of the mantissa product. The mantissa multiplier has a plurality of different possible sizes of the least significant bit portion. Energy consumption reduction logic is also included in the processor to selectively reduce energy consumption of the least significant bit portion, but not the most significant bit portion, to cause the least significant bit portion to not calculate the least significant bits of the mantissa product.

Example 22 includes the computer system of Example 21, further including logic to select one of the plurality of different possible sizes of the least significant bit portion based, at least in part, on the floating point addend data element.

Example 23 includes the computer system of any one of Examples 21 to 22, in which the mantissa multiplier further includes an intermediate portion, which is coupled between the most and least significant bit portions, to calculate intermediate bits of the mantissa product that are to be between the most significant bits and the least significant bits. Also, in which the energy consumption reduction logic includes logic to determine, based on the intermediate bits, whether the least significant bits could have affected the most significant bits of the mantissa product.

Example 24 includes the computer system of Example 23, in which the intermediate portion is in an initial portion of a pipeline and the least significant bit portion is in a subsequent portion of the pipeline.

Example 25 includes the computer system of any one of Examples 21 to 24, in which the energy consumption reduction logic includes clock gate logic, which is coupled to the least significant bit portion, to selectively gate a clock signal to the least significant bit portion, but not the most significant bit portion.

Example 26 includes a system-on-chip that includes at least one interconnect, the processor of any one of Examples 1 to 15 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 27 is a processor or other apparatus operative to perform the method of any one of Examples 15 to 20.

Example 28 is a processor or other apparatus that includes means for performing the method of any one of Examples 15 to 20.

Example 29 is a processor or other apparatus that includes any combination of modules and/or units and/or logic and/or circuitry and/or means operative to perform the method of any one of Examples 15 to 20.

Example 30 is a processor or other apparatus substantially as described herein.

Example 31 is a processor or other apparatus that is operative to perform any method substantially as described herein.

What is claimed is:

1. A processor comprising:
a floating point multiply-add unit having inputs coupled to receive a floating point multiplier data element, a floating point multiplicand data element, and a floating point addend data element, the floating point multiply-add unit including:
a mantissa multiplier to multiply a mantissa of the floating point multiplier data element and a mantissa of the floating point multiplicand data element to calculate a mantissa product, the mantissa multiplier including:
a most significant bit portion to calculate most significant bits of the mantissa product;
a least significant bit portion to calculate least significant bits of the mantissa product, wherein the mantissa multiplier has a plurality of different possible sizes of the least significant bit portion;
energy consumption reduction logic to selectively reduce energy consumption of the least significant bit portion, but not the most significant bit portion, to cause the least significant bit portion to not calculate the least significant bits of the mantissa product; and
carry isolation verification logic to determine whether a value of the least significant bit portion can affect a value of the most significant bits of the mantissa product.

2. The processor of claim 1, further comprising logic to select one of the plurality of different possible sizes of the least significant bit portion based, at least in part, on the floating point addend data element.

3. The processor of claim 2, wherein the logic is to select the one size based, at least in part, on an exponent of the floating point addend data element.

4. The processor of claim 3, wherein the logic is to select the one size based, at least in part, on the exponent of the floating point addend data element, and a sum of an exponent of the floating point multiplier data element and an exponent of the floating point multiplicand data element.

5. A processor comprising:
a floating point multiply-add unit having inputs coupled to receive a floating point multiplier data element, a floating point multiplicand data element, and a floating point addend data element, the floating point multiply-add unit including:
a mantissa multiplier to multiply a mantissa of the floating point multiplier data element and a mantissa of the floating point multiplicand data element to calculate a mantissa product, the mantissa multiplier including:
a most significant bit portion to calculate most significant bits of the mantissa product;
a least significant bit portion to calculate least significant bits of the mantissa product, wherein the mantissa multiplier has a plurality of different possible sizes of the least significant bit portion;
an intermediate portion, which is coupled between the most and least significant bit portions, to calculate intermediate bits of the mantissa product that are to be between the most significant bits and the least significant bits; and
energy consumption reduction logic to selectively reduce energy consumption of the least significant bit portion, but not the most significant bit portion, to cause the least significant bit portion to not calculate the least significant bits of the mantissa product.

6. The processor of claim 5, wherein the energy consumption reduction logic comprises logic to determine, based on the intermediate bits, whether the least significant bits could have affected the most significant bits of the mantissa product.

7. The processor of claim 5, wherein the intermediate portion is in an initial portion of a pipeline and the least significant bit portion is in a subsequent portion of the pipeline.

8. The processor of claim 5, wherein the intermediate portion and the least significant bit portion are in a same portion of the pipeline.

9. The processor of claim 1, wherein the most significant bit portion is to calculate all most significant bits of the mantissa product that are to be added to a mantissa of the floating point addend data element.

10. A processor comprising:
a floating point multiply-add unit having inputs coupled to receive a floating point multiplier data element, a floating point multiplicand data element, and a floating point addend data element, the floating point multiply-add unit including:
a mantissa multiplier to multiply a mantissa of the floating point multiplier data element and a mantissa of the floating point multiplicand data element to calculate a mantissa product, the mantissa multiplier including:
a most significant bit portion to calculate most significant bits of the mantissa product;
a least significant bit portion to calculate least significant bits of the mantissa product, wherein the mantissa multiplier has a plurality of different possible sizes of the least significant bit portion; and
energy consumption reduction logic to selectively reduce energy consumption of the least significant bit portion, but not the most significant bit portion, to cause the least significant bit portion to not calculate the least significant bits of the mantissa product, wherein the energy consumption reduction logic comprises clock gate logic, which is coupled to the least significant bit portion, to selectively gate a clock signal to the least significant bit portion, but not the most significant bit portion.

11. The processor of claim 1, wherein the mantissa multiplier has at least three different possible sizes of the least significant bit portion.

12. The processor of claim 1, wherein the mantissa multiplier comprises a 53-bit by 53-bit multiplier.

13. The processor of claim 1, wherein the mantissa multiplier comprises a 24-bit by 24-bit multiplier.

14. The processor of claim 1, wherein the mantissa multiplier comprises a 11-bit by 11-bit multiplier.

15. A method in a processor comprising:
starting a floating point multiply-add operation on a floating point multiplier data element, a floating point multiplicand data element, and a floating point addend data element;
multiplying a mantissa of the floating point multiplier data element and a mantissa of the floating point multiplicand data element to calculate a mantissa product, without calculating a least significant bit portion of the mantissa product that has a size that is based, at least in part, on the floating point addend data element; and
selectively reducing energy consumption of a portion of a mantissa multiplier that corresponds to the least significant portion of the mantissa product, without reducing energy consumption of a portion of the mantissa multiplier that corresponds to a most significant portion of the mantissa product.

16. The method of claim 15, further comprising selecting the size based, at least in part, on an exponent of the floating point addend data element, and a sum of an exponent of the floating point multiplier data element and an exponent of the floating point multiplicand data element.

17. The method of claim 15, further comprising selecting the size from a plurality of different possible sizes based, at least in part, on the floating point addend data element.

18. The method of claim 15, further comprising:
calculating an intermediate portion of the mantissa product between the least significant bit portion of the mantissa product and a most significant bit portion of the mantissa product; and
determining based on the intermediate portion whether least significant bit portion of the mantissa product could have affected the most significant bit portion of the mantissa product.

19. The method of claim 15, wherein said selectively reducing the energy consumption comprises clock gating the portion of the mantissa multiplier that corresponds to the least significant portion of the mantissa product.

20. A computer system comprising:
an interconnect;
a memory coupled with the interconnect; and
a processor coupled with the interconnect, the processor comprising:
a floating point multiply-add unit having inputs coupled to receive a floating point multiplier data element, a floating point multiplicand data element, and a floating point addend data element, the floating point multiply-add unit including:
a mantissa multiplier to multiply a mantissa of the floating point multiplier data element and a mantissa of the floating point multiplicand data element to calculate a mantissa product, the mantissa multiplier including:
a most significant bit portion to calculate most significant bits of the mantissa product;
a least significant bit portion to calculate least significant bits of the mantissa product, wherein the mantissa multiplier has a plurality of different possible sizes of the least significant bit portion; and
energy consumption reduction logic to selectively reduce energy consumption of the least significant bit portion, but not the most significant bit portion, to cause the least significant bit portion to not calculate the least significant bits of the mantissa product; and
carry isolation verification logic to determine whether a value of the least significant bit portion can affect a value of the most significant bits of the mantissa product.

21. The computer system of claim 20, further comprising logic to select one of the plurality of different possible sizes of the least significant bit portion based, at least in part, on the floating point addend data element.

22. The computer system of claim 20, wherein the mantissa multiplier further comprises an intermediate portion, which is coupled between the most and least significant bit portions, to calculate intermediate bits of the mantissa product that are to be between the most significant bits and the least significant bits, and wherein the energy consumption reduction logic comprises logic to determine, based on the intermediate bits, whether the least significant bits could have affected the most significant bits of the mantissa product.

23. The computer system of claim 22, wherein the intermediate portion is in an initial portion of a pipeline and the least significant bit portion is in a subsequent portion of the pipeline.

24. The computer system of claim 20, wherein the energy consumption reduction logic comprises clock gate logic, which is coupled to the least significant bit portion, to selectively gate a clock signal to the least significant bit portion, but not the most significant bit portion.

* * * * *